United States Patent [19]

Tsunoda et al.

[11] Patent Number: 5,064,275

[45] Date of Patent: Nov. 12, 1991

[54] LIQUID CRYSTAL DISPLAY DEVICE HAVING OPTICALLY ACTIVATABLE SWITCH MEANS

[75] Inventors: Ichiro Tsunoda, Kawasaki; Toshiyasu Eguchi, Tsukuba, both of Japan

[73] Assignees: Victor Company of Japan, Ltd.; Tokai Company, both of Japan

[21] Appl. No.: 671,990

[22] Filed: Mar. 18, 1991

Related U.S. Application Data

[63] Continuation of Ser. No. 569,858, Aug. 20, 1990, abandoned, which is a continuation of Ser. No. 204,608, Jun. 9, 1988, Pat. No. 4,952,031.

[30] Foreign Application Priority Data

Jun. 19, 1987 [JP] Japan ................................. 62-152460
Jun. 19, 1987 [JP] Japan ................................. 62-152461
Jul. 8, 1987 [JP] Japan ................................. 62-170524

[51] Int. Cl.$^5$ .............................................. G02F 1/13
[52] U.S. Cl. ........................................ 359/55; 359/58; 359/72
[58] Field of Search ............... 350/345, 332, 333, 342, 350/351, 96.13, 96.16, 96.2, 96.1, 96.3

[56] References Cited

U.S. PATENT DOCUMENTS

| | | | |
|---|---|---|---|
| 3,988,056 | 10/1976 | Hareng et al. | 350/331 R |
| 4,798,435 | 1/1989 | Fujiwara et al. | 350/96.13 |
| 4,952,031 | 8/1990 | Tsunoda et al. | 350/342 |

FOREIGN PATENT DOCUMENTS 0134599 3/1985 European Pat. Off. .

OTHER PUBLICATIONS

Stephens et al, "A Multichip MOS Video Rate Liquid Crystal Display", 1976 SID Int. Symp., Digest of Technical Papers, pp. 44–45.
Matsukawa et al, "A Continuous Very-Large Area Liquid Crystal Color Display", 1985 SID Int. Digest of Technical Papers, pp. 58–61.
Myodo et al, "A Large Screen Color Display Using an Array of LCD Modules", Proceeding of Japan Display, 1983, pp. 430–432.
Dewey et al, "A 4 Mpoh Liquid Crystal Projection Display Addressed by a GaAs Laser Array", 1982 SID Int. Symp. Digest of Technical papers, pp. 240–241.
Margerum et al, "Reversible Ultraviolet Imaging with LC", Appl. Phys. Lett., 17, pp. 51–53 (1970).
Soref, "Thermo-Optic Effects in Nematic-Cholesteric Mixtures", J. Appl. Phys., 41 (1970).
Lipton et al, "A 2.5" Diagonal High Contrast, Dynamic Scattering Liquid Crystal Matrix Display with Video Drivers", SID 78 Digest, pp. 96–97.
Karahara et al, "A 480×480 Element Dichroic Dye MOS-LCD", SID 78 Digest, pp. 150–151.

*Primary Examiner*—Stanley D. Miller
*Assistant Examiner*—Huy K. Mai
*Attorney, Agent, or Firm*—Andrus, Sceales, Starke & Sawall

[57] ABSTRACT

A liquid crystal display device comprises a plurality of lateral electrodes and a plurality of longitudinal electrodes carried on a pair of substrates. A scanning signal addressing one of the lateral electrodes is supplied to a scanning signal bus which is connected to each of the lateral electrode via an optically activated switch and a video signal to be supplied to one of the longitudinal electrodes is supplied to a display signal bus which is connected to each of the longitudinal signal bus. The optically activated switches are selectively activated by irradiation of an optical beam and the scanning signal and the video signal are supplied to the addressed electrodes.

6 Claims, 16 Drawing Sheets

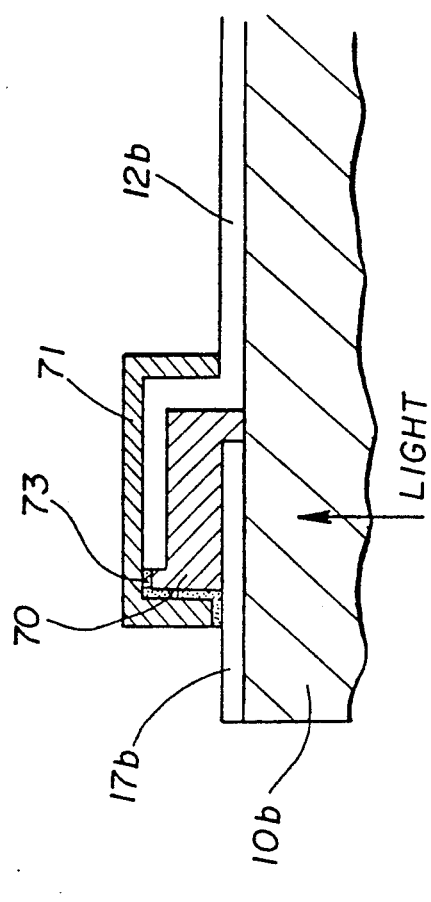
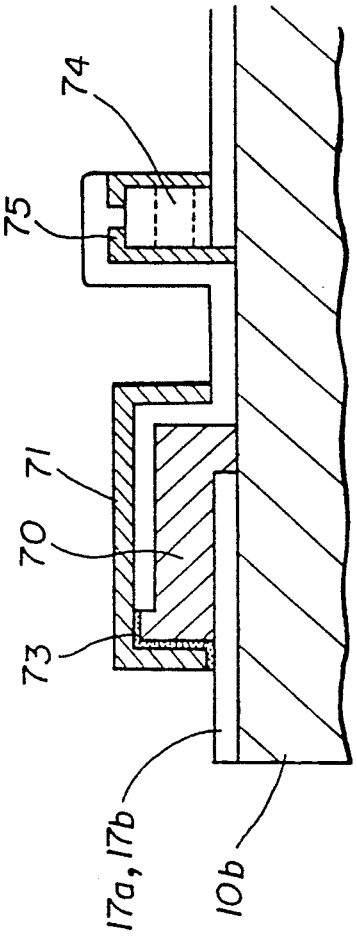

LIQUID CRYSTAL DISPLAY DEVICE HAVING OPTICALLY ACTIVATABLE SWITCH MEANS

The present application is a continuation application of co-pending U.S. patent application 07/569,858, filed Aug. 20, 1990, now abandoned, which, in turn, is a continuation of U.S. patent application 07/204,608, filed June 9, 1988, now U.S. Pat. No. 4,952,031, issued Aug. 28, 1990.

BACKGROUND OF THE INVENTION

The present invention generally relates to liquid crystal display devices having lateral electrodes arranged in parallel to each other for receiving a scanning signal which addresses a scanning line along which an image is to be displayed and longitudinal electrodes arranged in parallel to each other for receiving a video signal corresponding to the image to be displayed along the scanning line, and in particular to a liquid crystal display device arranged such that each of the lateral electrodes are electrically connected to a signal bus carrying the scanning signal and each of the longitudinal electrodes are electrically connected to another signal bus carrying the video signal via respective switches which are addressed by a radiation beam and supply the scanning signal and the video signal selectively to the desired electrodes.

Liquid crystal display devices are widely used as an apparatus for displaying images. In such a case when using the liquid crystal display device to display a high definition image such as a television picture where a large number of picture elements are involved, a large number of lateral and longitudinal electrodes have to be used to achieve the required resolution. A conventional liquid crystal display device has lateral and longitudinal electrodes which are extended to the outer periphery of the liquid crystal display device for connection to lead wires. Each of the lateral electrodes are sequentially supplied with a scanning voltage signal which addresses a scanning line along which an image is displayed, and each of the longitudinal electrodes are supplied with a video signal corresponding to the image to be displayed along the scanning line addressed by the scanning signal. In the description hereinafter, such lateral electrodes will be referred to as "scanning electrodes", and such longitudinal electrodes will be referred to as "display electrodes".

Currently, it is difficult to manufacture a liquid crystal display panel having a large display area from a single liquid crystal display device, mainly because of the difficulty in achieving the required flatness and accuracy of parallelism of mutually facing substrates which are disposed in parallel to each other. Particularly, in the case of the liquid crystal display device using the so called active matrix driving system where a large number of driving circuit devices are formed on the substrate in a form of thin films so as to drive respective pixels, the size of the display device is particularly limited because of the limited yield of such circuit devices.

A liquid crystal display panel having a large display area is usually manufactured as an assembly of a large number of liquid crystal display devices. The liquid crystal display devices are assembled in a form of a matrix, and each of the scanning and display electrodes of a liquid crystal display device is connected to one of the corresponding scanning and display electrodes of adjacent liquid crystal display devices. In other words, the scanning and display electrodes of a liquid crystal display devices are connected to the corresponding scanning and display electrodes of adjacent liquid crystal display devices in one to one correspondence.

In such a liquid crystal display panel, a gap of at least two or three millimeters is required between the display devices in order to accommodate the wires connecting the liquid crystal display devices. As such a gap provides a passage of light from a light source provided behind the liquid crystal display panel, the gap is closed by an opaque mask so as to shut off the undesirable leakage of light. Such a gap closed by the opaque mask extends along the boundary between the liquid crystal display devices laterally and longitudinally and creates an undesirable region in which the image is not displayed. Such a gap appears quite conspicuous in the display area and gives an uncomfortable psychological feeling to the person watching the images on the display panel.

Although such a gap can be made not conspicuous by setting the distance between the electrodes to such a value comparable to the width of the gap and by applying an opaque coating to the region between the electrodes, the use of such a coating decreases the efficiency of utilization of the light radiated from the light source behind the liquid crystal display panel to below 40%, for example. In other words, the images displayed on the device becomes dark when such a coating is used.

In the conventional liquid display panel using the conventional liquid crystal display devices, a relatively large space or gap is inevitably required for accommodating the complicated wiring at the boundary of the liquid crystal display devices, and this gap cannot be satisfactorily reduced even with the use of extremely fine wires, or with the use of so called elastic connectors which connect the electrodes via an alternately stacked layers of conductors and non-conductors.

It should be noted that the number of the scanning and display electrodes used in the liquid crystal display panel having a large display area is enormous, and the entire scanning and display electrodes in the liquid crystal display panel are addressed at a same time. In other words, a series of video signals corresponding to an image to be displayed along a selected scanning line are supplied simultaneously to all of the display electrodes and the scanning signal addressing that scanning line is supplied to the corresponding scanning electrode extending throughout the liquid crystal display panel. Thus, the wiring connecting the individual electrodes to respective driving circuits also becomes complicated.

Further, there is a general tendency that the liquid crystal display device does not have a well defined threshold in the transmittance versus voltage characteristic curve. As a result, there is a tendency that a cross-talk appears between the neighboring pixels (See P.M. Alt and P. Pleshko, IEEE Trans.Electron Devices, ED-21 pp.146-155, 1977). In order to avoid such a cross-talk, one has to provide a sufficient separation between the neighboring electrodes. For this reason, the number of the electrodes addressed by the scanning signal in the line sequential addressing procedure is limited in the conventional liquid crystal display device. For example, the number of the scanning electrodes is limited to 64–130 for the cells using twist nematic liquid crystals and to 200–400 for the cells using super twist nematic liquid crystals (for example, see Wada, T. "Liquid crystal display devices using non-linear active devices" In: *Liquid Crystals—Its Application—*, K. Okano and S. Kobayashi (eds.) Chapter 4, pp.106-116, 1985 Baifukan, Tokyo). Thus, the construction of a large liquid crystal display panel using a large number of electrodes exceeding these numbers is extremely difficult as long as the conventional liquid crystal display devices are used.

Moreover, the frame frequency for addressing the scanning line is usually set to 16-64 Hz. Thus, the duration in which a particular scanning line is addressed decreases with an increase in the number of scanning lines. On the other hand, the liquid crystal usually requires several tens of milliseconds in order to respond. Thus, when the number of scanning lines is large, the time interval required for addressing the numerous scanning lines becomes excessive due to the accumulation of the response times. The effect of such a limited response time of the liquid crystal display device becomes particularly conspicuous when a motion picture is displayed. In such a case, the liquid crystal cannot follow the change in the picture and the contrast of the displayed picture is deteriorated.

SUMMARY OF THE INVENTION

Accordingly, it is a general object of the present invention to provide a novel and useful liquid crystal display device in which the problems aforementioned are eliminated.

Another and more specific object of the present invention is to provide a liquid crystal display device having a plurality of electrodes wherein the wiring to the individual electrodes is simplified, the reliability of operation is improved, and the wiring to adjacent liquid crystal display devices is simplified when a plurality of such liquid crystal display devices are assembled in a form of a matrix so as to form a large liquid crystal display panel having a large display area. According to the present invention, it becomes possible to assemble a liquid crystal display panel without forming a conspicuous gap between the adjacent liquid crystal display devices for accommodating the wires connecting the adjacent liquid crystal display devices to each other. As a result, the efficiency of the utilization of light from the light source is improved and the images displayed on the screen becomes brighter.

Another object of the present invention is to provide a liquid crystal display device comprising a substrate carrying a plurality of electrodes, a signal bus for carrying an electrical signal to be supplied to the electrodes, a series of radiation beam activated switch means provided between each of the electrodes and the signal bus for selectively supplying the electrical signal on the signal bus to a selected electrode responsive to irradiation of a radiation beam, and a transmitter means for producing the radiation beam which activates the switch means. According to the present invention, the liquid crystal display device receives the input electrical signals at an end of the signal bus located at a corner of the liquid crystal display device and the wiring between the adjacent liquid crystal display devices is simplified. Accordingly, the reliability of operation is improved. Even in such a case when assembling a plurality of such liquid crystal display devices to form a large liquid crystal display panel, it is sufficient to connect the end of the signal bus at the corner of the liquid crystal display device to another end of the signal bus of the adjacent liquid crystal display device which is located at the corner of the device. As a result, the gap between the adjacent liquid crystal display devices can be minimized and the efficiency of the utilization of the light from the light source is increased.

Another object of the present invention is to provide a liquid crystal display device comprising a substrate carrying a plurality of electrodes, receiver means for receiving a radiation beam modulated with a signal addressing a particular electrode and for producing an output signal corresponding to the signal modulated on the radiation beam, decoding means for decoding the output signal from the receiver means to produce an electrical signal addressing the selected electrode on the substrate, gating means associated with the individual electrodes for selectively exciting the selected electrode responsive to the electrical signal from the demodulating means, and a transmitter means for producing the radiation beam to be radiated to the receiver means. According to the present invention, the number of receiver and transmitter means can be reduced and the cross-talk between the receiver means (operation of the receiver means responsive to radiation beams from a plurality of the transmitter means) can be eliminated.

Another object of the present invention is to provide a liquid crystal display panel having a large display area comprising a plurality of liquid crystal display devices arranged in a row and column formation. Each of the liquid crystal display devices comprises a substrate carrying a plurality of electrodes, receiver means receiving a radiation beam from transmitter means for producing an output signal responsive to the radiation beam, and decoder circuit means for decoding the output signal of the receiver means and for producing an electrical signal addressing a selected electrode. According to the present invention, the electrodes are addressed within each of the liquid crystal display devices which form the liquid crystal display panel, in contrast to the prior art liquid display panel where a particular electrode has to be selected from the entire electrodes in the liquid crystal display panel. As a result, the addressing of the electrodes becomes easy even in such a case that numerous electrodes are used in the liquid crystal display panel. Furthermore, the liquid crystal display panel of the present invention has an advantage over the prior art in that the size of the display area can be changed as required without changing the design or construction of cooperating circuitry means. In addition, in contrast to the prior art, the time period required for selectively exciting the electrodes in the liquid crystal display panel can be kept constant without causing deterioration in the contrast of the images including moving pictures even in such a case that the number of the electrodes are increased significantly. Thus, according to the present invention, one can construct a liquid crystal display panel having a display area of an arbitrary size by arranging an arbitrary number of the liquid display devices in a row and column formation.

Another object of the present invention is to provide a liquid crystal display device wherein a plurality of electrodes formed on a substrate are addressed by an infrared beam. According to the present invention, it becomes possible to construct a projection type liquid crystal display apparatus using liquid crystals which change the molecular alignment responsive to the applied electric field. Such a liquid crystal display apparatus has an advantage in that the addressing of the electrodes are achieved by using the invisible infrared beam and that a wide variety of liquid crystals can be used.

Another object of the present invention is to provide a liquid crystal display device wherein a plurality of electrodes formed on a substrate are selectively and optically addressed via optical switch means which change in resistivity responsive to the intensity of the optical beam radiated thereon. According to the present invention, the structure of the optical switch means is simplified and the optical switch means is activated by the infrared beam which is invisible to the user.

Another object of the present invention is to provide a liquid crystal display device comprising a plurality of electrodes formed on a pair of substrates disposed in parallel to each other, optical receiver means irradiated by an optical beam modulated with a signal addressing a selected electrode for producing an output signal corresponding to the signal modulated on the optical beam, decoding means supplied with the output signal from the optical receiver means for producing a decoded output signal addressing the electrode, and gating means connected to the respective electrodes for exciting the electrodes responsive to the demodulated output signal, wherein the optical receiver means, decoding means and the gating means are disposed on the substrate in a region located outside of a display area which is defined by a perimeter seal for confining the liquid crystal. According to the present invention, the disturbance in the molecular alignment of the liquid crystal in the display area can be eliminated, and the optical receiver means, decoding means and the gating means mounted on the substrate can be easily formed.

Another object of the present invention is to provide a liquid crystal display device comprising a plurality of electrodes formed on a substrate, optical receiver means for receiving an optical signal which addresses the electrodes, and a light emitting device wherein the optical receiver means is sequentially scanned by an optical beam emitted from the light emitting device. According to the present invention, the number of the light emitting device can be reduced and the separation between one light emitting device and an adjacent light emitting device can be increased. As a result, the cross-talk between the adjacent optical receiver means can be suppressed.

Still other objects and further features of the present invention will become apparent from the following detailed description when read in conjunction with the accompanying drawings.

BRIEF DESCRIPTION OF THE DRAWINGS

FIG. 4 is a cross sectional view showing an embodiment of the optical switch device used in the present invention;

FIG. 7 is a cross sectional view showing a modification of the optical switch device;

DETAILED DESCRIPTION

Conventionally, a liquid crystal display panel having a large display area is formed as an assembly of a plurality of liquid crystal display devices. In other words, the desirable large display area is divided into small display blocks. Each of the small display blocks corresponds to the display area of the individual liquid crystal display devices which are arranged in a row and column formation to form a large display area. Thus, each of the individual liquid crystal display devices are electrically connected to each other to display an image on the large display area thus formed. Each of scanning and display electrodes of a liquid crystal display device is connected to corresponding electrode of the neighboring liquid crystal display devices by means of an elastic connector comprising alternating layers of conductors and non-conductors or a thin flexible cable containing numerous wires in parallel in a one-to-one relation.

In such a conventional liquid crystal display panel, the mutual connection between the electrodes becomes increasingly complex and difficult with increasing number of pixels. Further, the number of wires used to supply the electrical signals to these electrodes also increases and the manufacturing step of the liquid crystal display panel becomes complex. Furthermore, such a complex wiring of the liquid crystal display panel tends to deteriorate the reliability of the operation due to defective connections.

Figure 1:
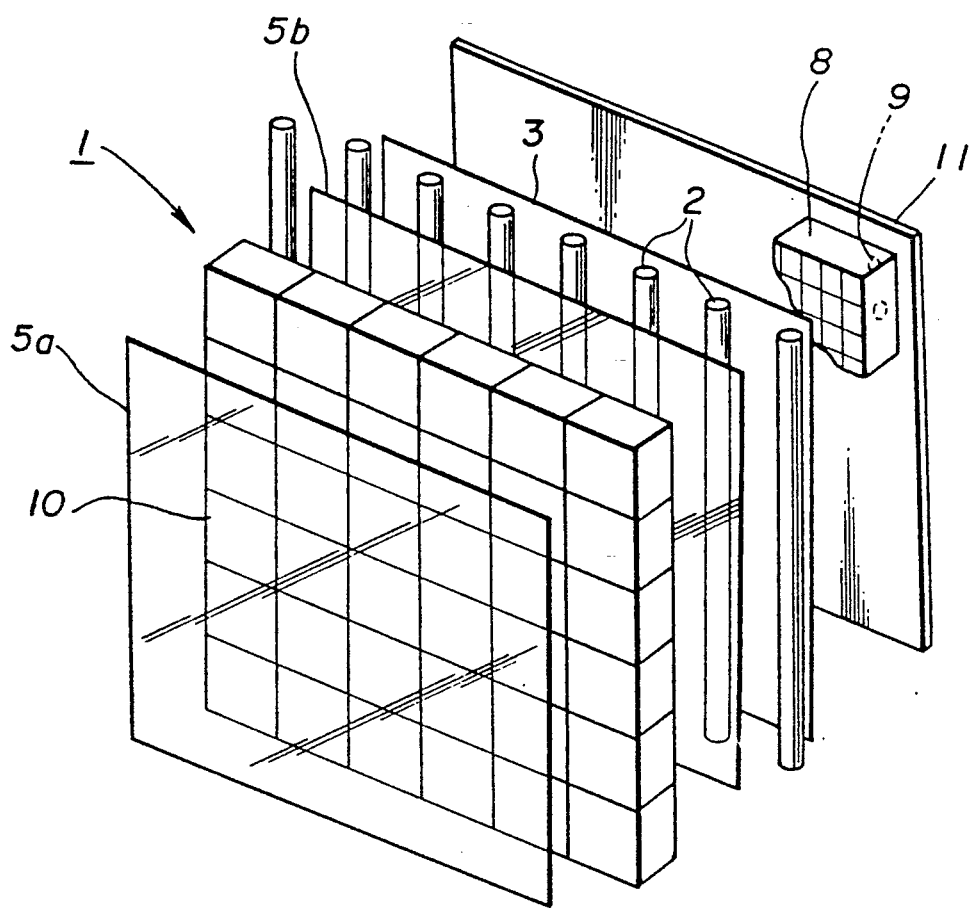
FIG. 1 is a perspective view showing a liquid crystal display panel having a large display area constructed by assembling the liquid crystal display devices of the present invention.

FIG. 1 shows a liquid crystal display unit having a large display area constructed by assembling the liquid crystal display device of the present invention. The liquid crystal display unit comprises a liquid crystal display panel 1 having a large display area formed by assembling a plurality of liquid crystal display devices 10, a light source 2 disposed behind the liquid crystal display panel 1, and a reflector 3 disposed behind the light source 2 for reflecting the light radiated from the light source 2. Further, polarizers 5a and 5b are disposed in front of the panel 1 and behind the panel 1 at a position between the panel 1 and the light source 2, respectively.

In each of the liquid crystal display devices 10 assembled in a form of a liquid crystal display panel 1, the scanning and display electrodes in a display device 10 are connected to corresponding electrodes in a neighboring display device via a scanning signal bus and a display signal bus to be described later and each of the pixels are addressed by an optical beam. In order to achieve such optical addressing, a light emitting device 9 to be described later is provided on a substrate 11 located further behind the reflector 3. This light emitting device 9 cooperates with an optically activated switch (not shown in FIG. 1) in the liquid crystal display device 10 and produces a preferably infrared invisible optical beam which turns on and turns off the optically activated switch which cooperates with the electrode in the display device 10. It should be noted that the reflector 3 is designed to pass the optical beam from the light emitting device selectively. In FIG. 1, only a few representative light emitting devices are shown in order to avoid complexity of the drawing.

In order to improve the directivity of the optical beam from the light emitting device 9, an optical louver 8 may be interposed between the light emitting device 9 and the optically activated switch as shown in FIG. 1. The optical louver 8 is a plate like device comprising a number of cells opened at both ends and separated from each other by separation walls which define the cell. Such a cell in the louver 8 extends along the optical path connecting the light emitting device 9 to the cooperating optically activated switch. FIG. 1 shows only a part of such optical louver 8 for the sake of simplicity. Using such an optical louver 8, the optical beam from the light emitting device is directed to the corresponding switch along the cell and the directivity of the optical beam is improved. As a result, the problem of cross-talk in which one optically activated switch responds to more than one light emitting device is minimized.

Figure 2:
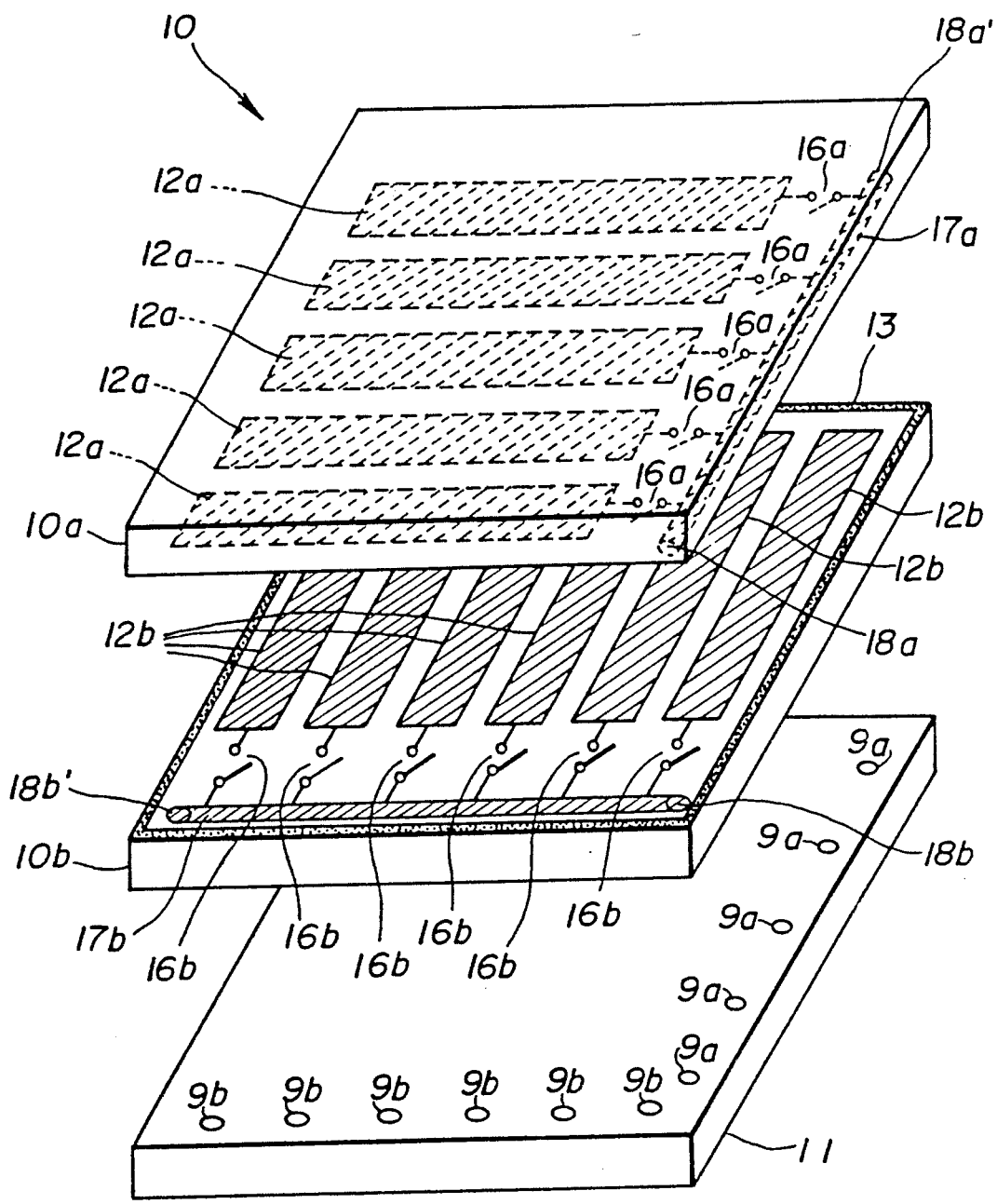
FIG. 2 is an exploded perspective view showing a first embodiment of the liquid crystal display device of the present invention.

FIG. 2 shows a first embodiment of the liquid crystal display device 10 of FIG. 1 together with a portion of the substrate 11 carrying the light emitting device 9a, 9b which corresponds to the light emitting device 9 of FIG. 1. For the sake of clarity of the drawing, the optical louver 8 is not illustrated.

FIG. 2 shows a simple matrix array type liquid crystal display device comprising a pair of substrates 10a and 10b which extend in parallel with a uniform separation. The substrates 10a carries on a side facing to the substrate 10b a plurality of lateral stripe electrodes 12a extending parallel to each other. Further, the substrate 10b carries on a side facing the substrate 10a a plurality of longitudinal stripe electrodes 12b which extend parallel to each other. The electrodes 12a and 12b are transparent and have a thickness of 100-500Å. The lateral stripe electrodes 12a are supplied with a scanning signal to be supplied to a line along which an image is to be displayed, and the longitudinal electrodes 12b are supplied with a video signal corresponding to the image to be displayed along the line addressed by the scanning signal. Thus, the lateral electrode 12a and the longitudinal electrode 12b will be referred to respectively as a scanning electrode and the display electrode. The scanning and display electrodes may be formed by deposition of indium tin oxide commonly known as an ITO film or by deposition of $SnO_2$ (trade name NESA film) on the substrate 10a, 10b made of a transparent glass or plastic. Further, a molecular alignment layer not shown in the drawing is formed on the scanning and display electrodes 12a and 12b.

A liquid crystal substance is introduced into a region between the substrates 10a and 10b defined by a perimeter seal 13 and forms a confined liquid crystal layer. The molecular alignment layer aforementioned is formed by a known method and induces an appropriate molecular alignment in the liquid crystal layer. A suitable liquid crystal substance is a nematic phase liquid crystal or a smectic phase liquid crystal. These liquid crystals may be chosen from a group of liquid crystals comprising the Shiff's base compounds, azo compounds, azoxy compounds, benzoicester compounds, biphenyl compounds, terphenyl compounds, cyclohexylcarboxylester compounds, phenylcyclohexane compounds, pyrimidine compounds, dioxane compounds and a mixture thereof. In order to stabilize the alignment of the liquid crystal molecules, a suitable amount of chiral compounds may be added. Further, depending on the applications, a suitable amount of dye may be added.

When a color display is required, filters of three primary colors may be disposed on the surface of the substrate 10a facing the the substrate 10b. Alternatively, the polarizers 5a or 5b may be suitably colored.

In such a simple matrix array type liquid crystal display device, the pixels are defined at the intersections of the electrode 12a and the electrode 12b.

Referring to FIG. 2, each of the scanning electrodes 12a are connected to a scanning signal bus 17a via an optically activated switch 16a provided on the substrate 10a at the side on which the electrodes 12a are provided. This scanning signal bus 17a extends along an edge of the substrate 10a on the same side on which the switch 16a and the electrodes 12a are provided, and connecting terminals 18a and 18a' are formed at both ends of the bus 17a. Similarly, each of the display electrodes 12b are connected to a display signal bus 17b via an optically activated switch 16b provided on the substrate 10b at the side on which the electrodes 12b are provided. This display signal bus 17b extends along an edge of the substrate 10b on the same side on which the switch 16b and the electrodes 12b are provided, and connecting terminals 18b and 18b' are formed at both ends of the bus 17b. Further, the light emitting devices 9a and 9b described previously are disposed on the substrate 11 which is facing the other side of the substrate 10b so as to cooperate with the corresponding optically activated switches 16a and 16b.

Thus, when one of the light emitting devices 9a is selectively activated, it produces an optical beam which hits the corresponding optically activated switch 16a and the switch 16a is turned on. When the switch 16a is turned on, the scanning signal on the scanning signal bus 17a is supplied to the electrode 12a to which the switch 16a activated by the optical beam is connected. Similarly, when one of the light emitting devices 9b is selectively activated, it produces an optical beam which hits the corresponding optically activated switch 16b and the switch 16b is turned on. When the switch 16b is turned on, the video signal on the display signal bus 17b is supplied to the electrode 12b to which the switch 16b activated by the optical beam is connected. Thus an image is displayed on a selected pixel in a selected line.

Any known phototransistors or photodiodes may be used for the optically activated switches 16a and 16b. However, it is particularly advantageous to use switches which use PbS, PbSe or InAs compound as an optically sensitive layer controlling the conduction of the switch. Such a compound exhibits a significant photoelectric effect against the infrared radiation having a wavelength longer than 800 nm, for example, and reduces the resistivity significantly responsive to the radiation. Such an optically activated switch using the aforementioned compounds further provides an advantage that the known GaAlAs or GaAsP devices can be used as the light emitting devices 9a, 9b. The optically activated switches 16a and 16b may be provided by mounting the chip of such a switch device on the substrate 10a and 10b. Alternatively, these switches may be formed by depositing materials on the region between the electrode 12a, 12b and the signal bus 17a, 17b using photomasks. The light emitting devices 9a and 9b may be a chip of such devices commonly used. Alternatively, such devices may be formed on the substrates by depositing materials using photomasks.

In order to avoid the deterioration of the images displayed on the display area by the light radiated from the light source 2 and passing through the region between the electrodes 12a or 12b, an opaque coating is applied on the surfaces of the substrate 10a and 10b on which are formed the electrodes 12a and 12b for those regions defined by the perimeter seal 13 except for portions corresponding to the electrodes and the optical path of the optical beam emitted from the light emitting devices 9a and 9b and reaching the corresponding switches 16a and 16b.

Further, it is preferred to provide optical guiding means such as the optical louver 8 shown in FIG. 1 or an optical fiber (not shown in FIG. 2) between the optically activated switches 16a, 16b and the light emitting devices 9a, 9b in order to improve the directivity of the optical beam so that the optically activated switches 16a and 16b positively cooperate with the light emitting devices 9a, 9b without causing cross-talk. As a result of use of such optical guiding means, the light emitting devices 9a, 9b may be disposed at a location relatively far from the cooperating optically activated switches 16a, 16b and the degree of freedom in the design and assembly of the liquid crystal display device is increased.

When constructing the liquid crystal display panel 1 of FIG. 1, each of the liquid crystal display devices are arranged in a row and column formation and the terminals 18a and 18a' of the scanning signal bus of a liquid crystal display device is connected to the corresponding terminals 18a' and 18a of the scanning signal bus of the adjacent liquid crystal display device. Similarly, the terminals 18b and 18b' of the display signal bus of a liquid crystal display device is connected to the corresponding terminals 18b' and 18b of the display signal bus of the adjacent liquid crystal display device. As a result, the scanning signal buses of the liquid crystal display devices aligned in the longitudinal direction are connected in series and the liquid crystal display devices connected as such are aligned in the longitudinal direction throughout the liquid crystal display panel. Each of the scanning signal busses thus connected is connected to a lead wire connected to a corresponding driving circuit (not shown). Similarly, the display signal buses of the liquid crystal display devices aligned in the lateral direction are connected in series and the liquid crystal display devices thus connected are aligned in the lateral direction throughout the liquid crystal display panel. Each of the display signal busses thus connected is connected to a lead wire connected to a corresponding driving circuit (not shown). Thus, each of the liquid crystal display devices in the liquid crystal display panel is connected to the adjacent liquid crystal display devices by connection of one scanning signal bus and one display signal bus to corresponding signal buses of the adjacent liquid crystal display devices. As a result, the wiring between the adjacent liquid crystal display devices is simplified and the undesirable gap between the display devices for accommodating the lead wires used for the connection is minimized. As a result, the efficiency of utilization of the light of the light source is improved by as much as 80% or more.

Next, the operation of the liquid crystal display device of FIG. 2 will be described.

Referring to the drawing, the scanning signal is supplied to the scanning signal bus 17a via the terminal 18a. The optically activated switches 16a are sequentially turned on and the scanning signal on the scanning signal bus 17a is supplied to each of the scanning electrodes 12a sequentially. The activation of the optically activated switches 16a is controlled by the optical beam from the light emitting devices 9a as previously described.

In synchronization with the supply of the scanning signal as aforementioned, a video signal is supplied to the display signal bus 17b via the terminal 18b, and this video signal is supplied to the respective display electrodes via the optically activated switches 16b which are turned on and turned off responsive to the optical beam form the light emitting devices 9b.

As described previously, such a simple matrix array type liquid crystal display device may be assembled in a row and column formation to form a large liquid crystal display panel. In such a case, the scanning signal bus 17a and the display signal bus 17b are connected to the corresponding signal buses of the adjacent liquid crystal display devices by connecting the terminals 18a and 18b at a corner of the liquid crystal display device to the terminals 18a' and 18b' located at respective corners of the adjacent liquid crystal display devices by means of soldering of lead wires and the like.

Figure 3:
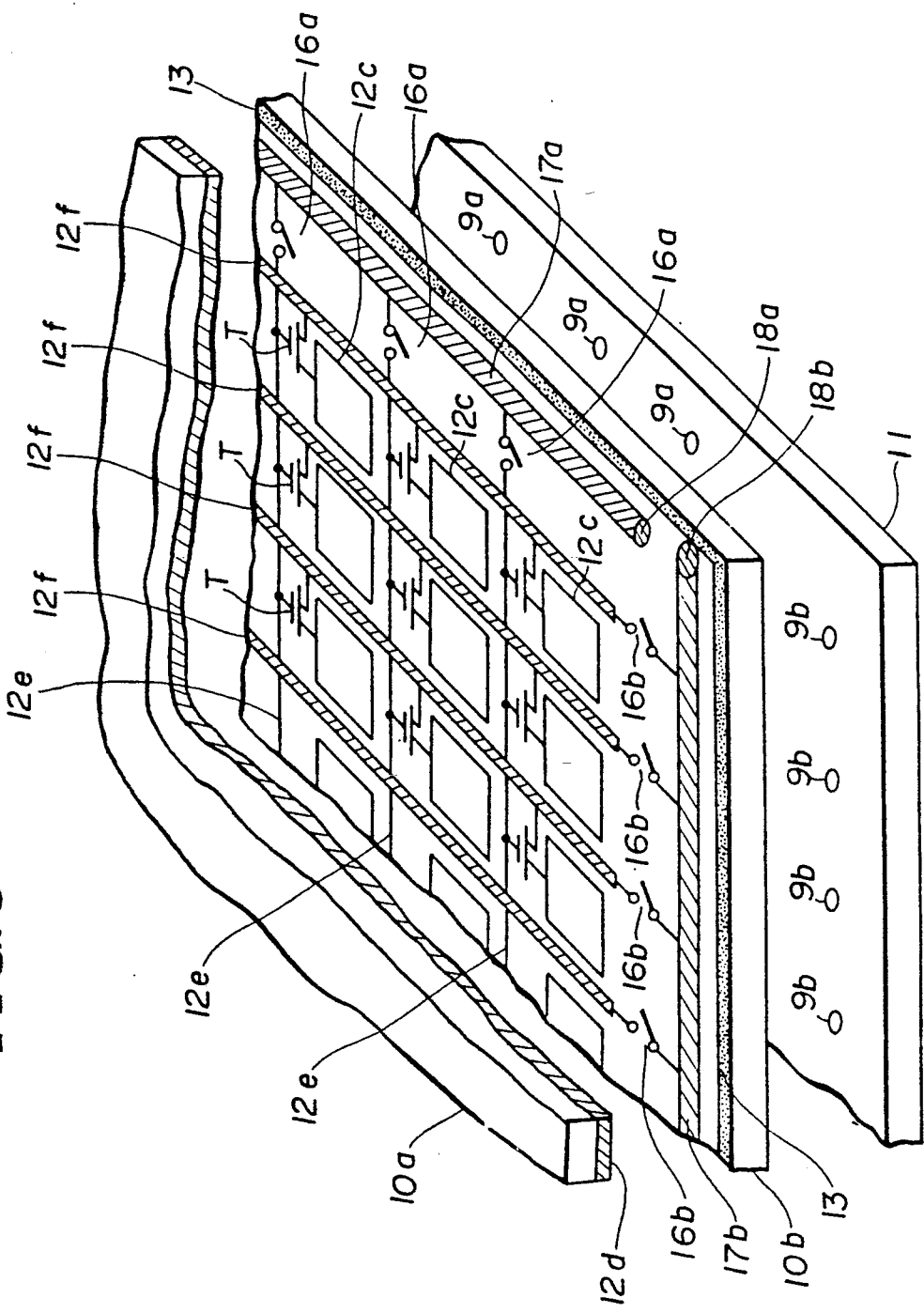
FIG. 3 is an exploded perspective view similar to FIG. 2 showing a modification of the liquid crystal display device of FIG. 2.

FIG. 3 shows a modification of the liquid crystal display device of FIG. 2. In the drawing, those portions constructed identically to those corresponding portions are given identical reference numerals and the description thereof will be omitted.

FIG. 3 is an exploded perspective view of the liquid crystal display device of the present embodiment in which the active matrix addressing system is utilized. Referring to the drawing, a plurality of scanning electrodes 12e and a plurality of display electrodes 12f, each being an electrode having an extremely limited width, are formed on the substrate 10b made of a transparent glass plate, for example, in a manner such that each of the scanning electrodes extend in parallel to each other, each of the display electrodes extend in parallel to each other, and such that each of the scanning electrodes and each of the display electrodes intersect perpendicularly to each other. The scanning electrodes and the display electrodes are electrically insulated from each other. Further, a plurality of pixel electrode 12c are formed in regions each being defined by two adjacent scanning electrodes 12e and two adjacent display electrodes 12f. Each of the pixel electrodes 12c is connected to a cooperating driving device T formed in the same region on the substrate 10b which controls the conduction between the pixel electrode 12c and the display electrodes 12f cooperating with the pixel electrode 12c. Further, a common electrode 12b is provided on the opposing substrate 10a on its entire surface which faces the substrate 10b. The pixel electrode 12d defines a pixel in the liquid crystal display device.

The active matrix driving system itself is a well known driving system of liquid crystal display device, and various devices are known for the driving device T such as the thin film transistors commonly known as the TFT device, metal-insulator-metal devices commonly known as MIM device, or diodes. Such devices can also be used in the liquid crystal display device of FIG. 3.

In the present modification, the optically activated switches 16a and 16b are turned on by the optical beam responsive to the activation of the corresponding light emitting devices 9a and 9b. In response to the activation of the switches 16a and 16b, the scanning signal is supplied to the driving device T which turns on the device T, and the video signal is supplied from the display signal bus 17b to the pixel electrode 12c via the switch 16b which is turned on by the the optical beam and the driving device T which is turned on by the scanning signal.

The liquid crystal display device of FIG. 3 uses combination of the optically activated switch 16a, 16b and the driving device T. However, the liquid crystal display devices of FIG. 2 and FIG. 3 may use a photovoltaic device such as a light activated SCR which is triggered responsive to the optical beam having a wavelength in the invisible region in place of the optically activated devices.

Next, an example of the optically activated switches 16a and 16b will be described with reference to FIGS. 4 through 7. As described previously, the optically activated switches 16a and 16b may be provided by known phototransistors or photodiodes.

From the view point of the operation of the liquid crystal display apparatus of the present invention it is preferred that the optically activated switch used in the liquid crystal display apparatus does not respond to the visible light. Further, such a switch is not only required to perform the photoelectric conversion responsive to the irradiation of the optical beam but also is required to hold the electrical charge in the pixel after the switch is activated and returned to the original state so that the state of the pixel is maintained until the pixel is addressed the next time.

FIG. 4 shows an example of the optically activated switch comprising a photosensitive conductor layer 70 which changes in resistivity responsive to the irradiation of an infrared beam having a wavelength in the region longer than about 800 nm. Referring to the drawing, the photosensitive conductor layer 70 is provided between the display signal bus 17b on the substrate 10b and the display electrode 12b on the substrate 10b, and changes in resistivity responsive to the optical beam incident thereto through the substrate 10b as indicated by an arrow according to a characteristic curve shown in FIG. 5. Further, the optically activated switch is covered by a shading cover 71 which shuts off the unwanted light incident on the photosensitive conductor layer 70 from the outside. Furthermore, a thin insulating layer 73 extends between the shading cover 71 and the substrate 17b as well as between the shading cover 71 and the conductor layer 70 so as to prevent the dissipation of the electrical charge of the pixel in a form of a dark current through the switch. The insulating layer 73 may be omitted when the shading cover is made from an electrically indulating material.

In use of the optically activated switches 16a and 16b, the scanning signal and the video signal are continuously supplied to all of the respective signal buses and the resistivity of the optically activated switches are modulated by the optical beam. As a result, the electrical field is selectively applied to the pixel in the liquid crystal layer. Further, it is possible to control the density of the image on the display area by suitably setting intensity of the optical beam so that the the resistivity of the photosensitive conductor layer assumes a suitable value when irradiated by the optical beam. The photosensitive conductor layer must have a sufficiently high resistivity when the switch is not addressed and have a sufficiently low resistivity when the switch is addressed.

The material for the photosensitive conductor layer may be chosen from a group of compounds comprising CdS, CdSe, Se, PbO, PbS, PbSe, ZnTe, CdTe and InSb, and a suitable amount of impurities are added to adjust the sensitivity and response time. Usually, a single crystal or sintered film of such a material having a thickness of 2-20 microns is used for the photosensitive conductor layer of the optically activated switches 16a and 16b.

Referring to FIG. 4 again, the optically activated switch 16b may be formed on the substrate 10b for example by providing a sintered film of a material forming the photosensitive layer such as CdS with a thickness of 5-10 microns on the transparent display electrode 17b of indium oxide or tin oxide deposited on the substrate 10b, etching the film to a predetermined shape of the photosensitive layer, depositing an indium oxide or tin oxide layer on the photosensitive layer, etching the layer of indium oxide or tin oxide thus deposited to a predetermined shape to form the display electrode 12b, and covering the entire device thus formed by the shading cover 71 of CdTe, for example. As already described, the insulating layer 73 is formed between the shading cover 71 and the display signal electrode 17b, and between the insulating cover 71 and the photosensitive conductor layer 70.

Figure 6:
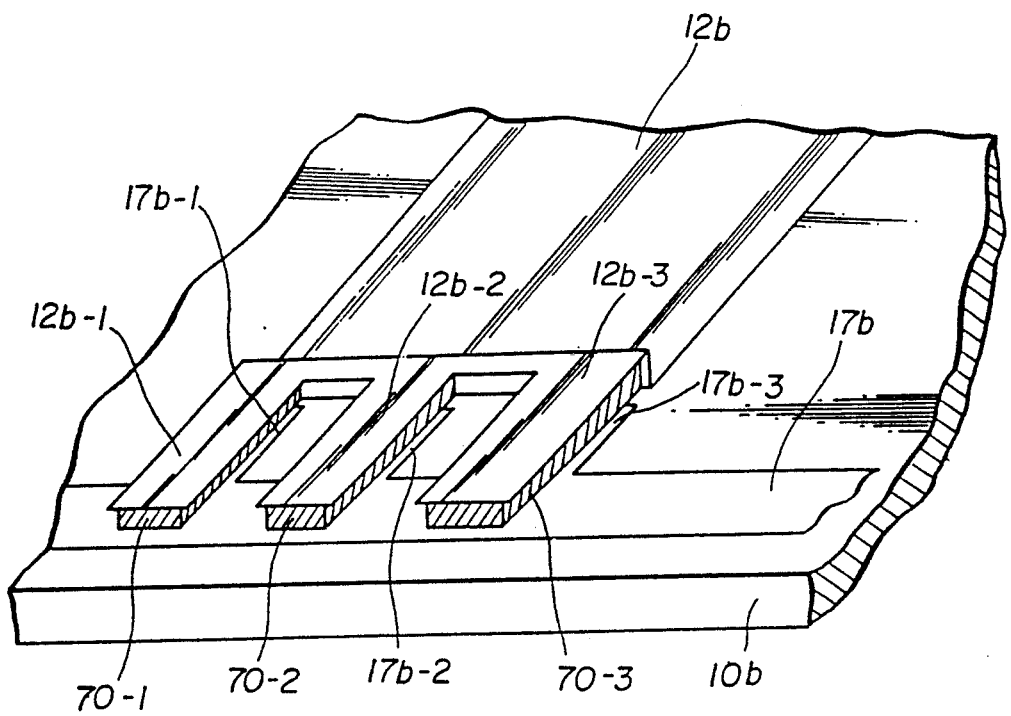
FIG. 6 is a perspective view showing the optical switch device formed on an electrode interdigit form.

FIG. 6 is a perspective view showing an example of the optically activated switch such as 16b provided on the substrate 10b. In this example, the optically activated switch 16b comprises electrode portions 12b-1, 12b-2 and 12b-3 arranged in a form of a comb shaped electrode, electrode portions 17b-1, 17b-2 and 17b-3 which correspond to the electrode portions 12b-1, 12b-2 and 12b-3 respectively to form a corresponding comb shaped electrode, and photosensitive conductor layers 70-1, 70-2 and 70-3 disposed between the respective electrode portions 17b-1 and 12b-1, 17b-2 and 12b-2, and 17b-3 and 12b-3. In this drawing, the shading cover 71 is not illustrated for the sake of clarity of the drawing. Using such comb shaped electrodes, a reliable switching operation is obtained.

Figure 5:
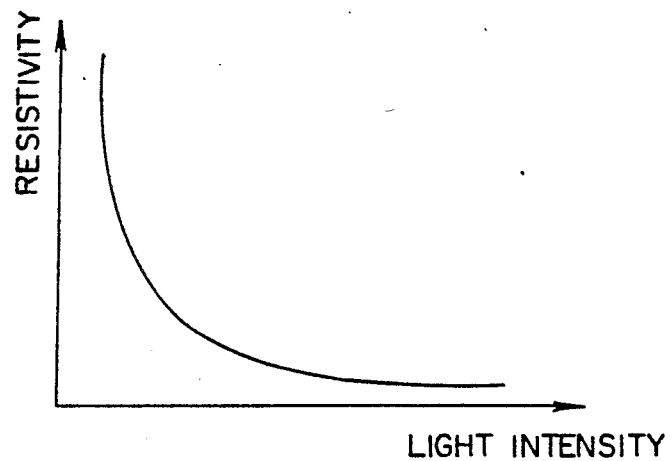
FIG. 5 is a graph showing an example of the characteristic of the optical switch device of FIG. 4.

In such a case that the resistance of the photosensitive conductor layer cannot satisfy the desired characteristic, a non-linear device such as the one shown in FIG. 7 may be provided to cooperate with the optically activated switch. In the example shown in FIG. 7, the non-linear device is a dual port device 74 comprising a PIN junction of amorphous silicon surrounded by an SiO2 insulating layer 75. Such a device induces an electromotive force responsive to the radiation of the optical beam and provides a conductive characteristic as shown in FIG. 5 to the optically activated switch. Using such a non-linear device together with the optically activated switches, the resistivity of the optically activated switches can be modulated responsive to the intensity of the optical beam incident to the switches which in turn is controlled by adjusting the voltage and current supplied to the light emitting device. As a result, the voltage to be applied to the electrodes can be controlled as desired and the display of gradation of the image becomes possible.

Figure 8:
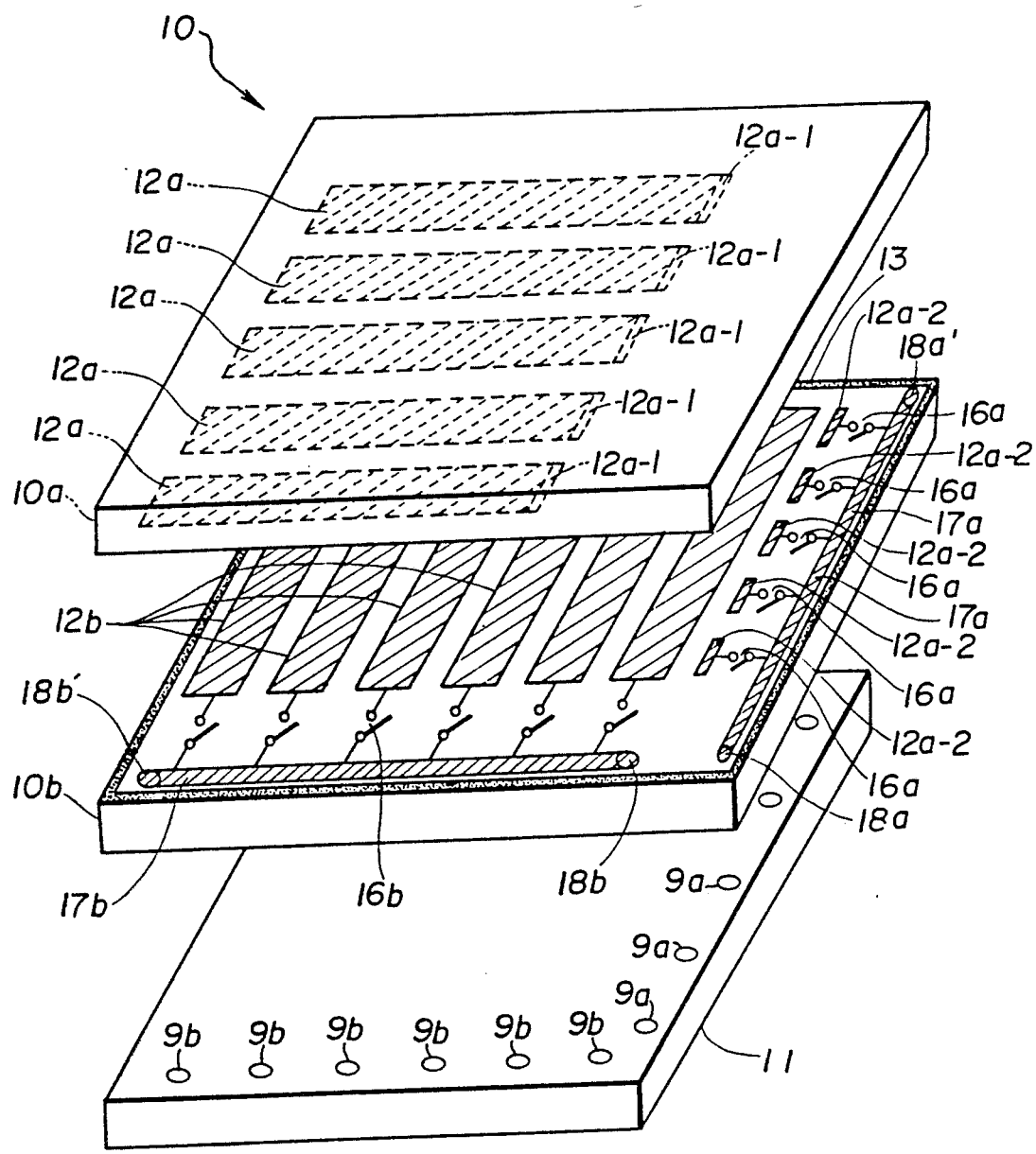
FIG. 8 is a cross sectional view showing another modification of the liquid crystal display device according to the first embodiment adapted for the use of the optical switch device of FIG. 4.

Meanwhile, the liquid crystal display device of FIG. 2 has to be modified when the optically activated switch as described with reference to FIGS. 4 through 7, which is designed to receive the optical beam through the transparent substrate on which the switch is provided, is used for the switch 16a on the substrate 10a. FIG. 8 shows such a modification in which the optically activated switch 16a is formed on the substrate 10b. In the drawing, those portions constructed identically to those corresponding portions of FIG. 2 are given the identical reference numerals and the description thereof will be omitted.

Referring to FIG. 8, both of the optically activated switches 16a and 16b are constructed according to the previous description with reference to FIGS. 4 through 7 and are provided on the substrate 10b. At an end of the scanning electrode 12a on the substrate 10a there is formed a contact 12a-1 composed of a conductive paint or metal film, and a corresponding contact 12a-2 is formed on the substrate 10b. The contacts 12a-1 and 12a-2 are contacted to each other when the substrates 10a and 10b are assembled.

In the present modification, the scanning signal bus 17a is formed on the substrate 10b and the connection between the contact 12a-2 and the scanning signal bus 17a is opened and closed by the optically activated switch 16a on the substrate 10b responsive to the optical beam which reaches the switch 16a by passing through the substrate 10b from the light emitting device 9a. Other construction and operation of the liquid crystal display device of FIG. 8 is identical to those described previously, and therefore further description will be omitted. It should be noted that the liquid crystal display device shown in FIG. 3 requires no such modification as the optically activated switches 16a and 16b are both provided on the substrate 10b.

Next, a second embodiment of the liquid crystal display device of the present invention will be described with reference to FIGS. 9 and 10 which are respectively an exploded perspective view schematically showing the liquid crystal display device and a circuit diagram equivalent to the electrical circuit formed on the liquid crystal display device. In the drawing, those portions constructed identically to those corresponding portion of FIG. 2 are given identical reference numerals and the description thereof will be omitted.

Figure 9:
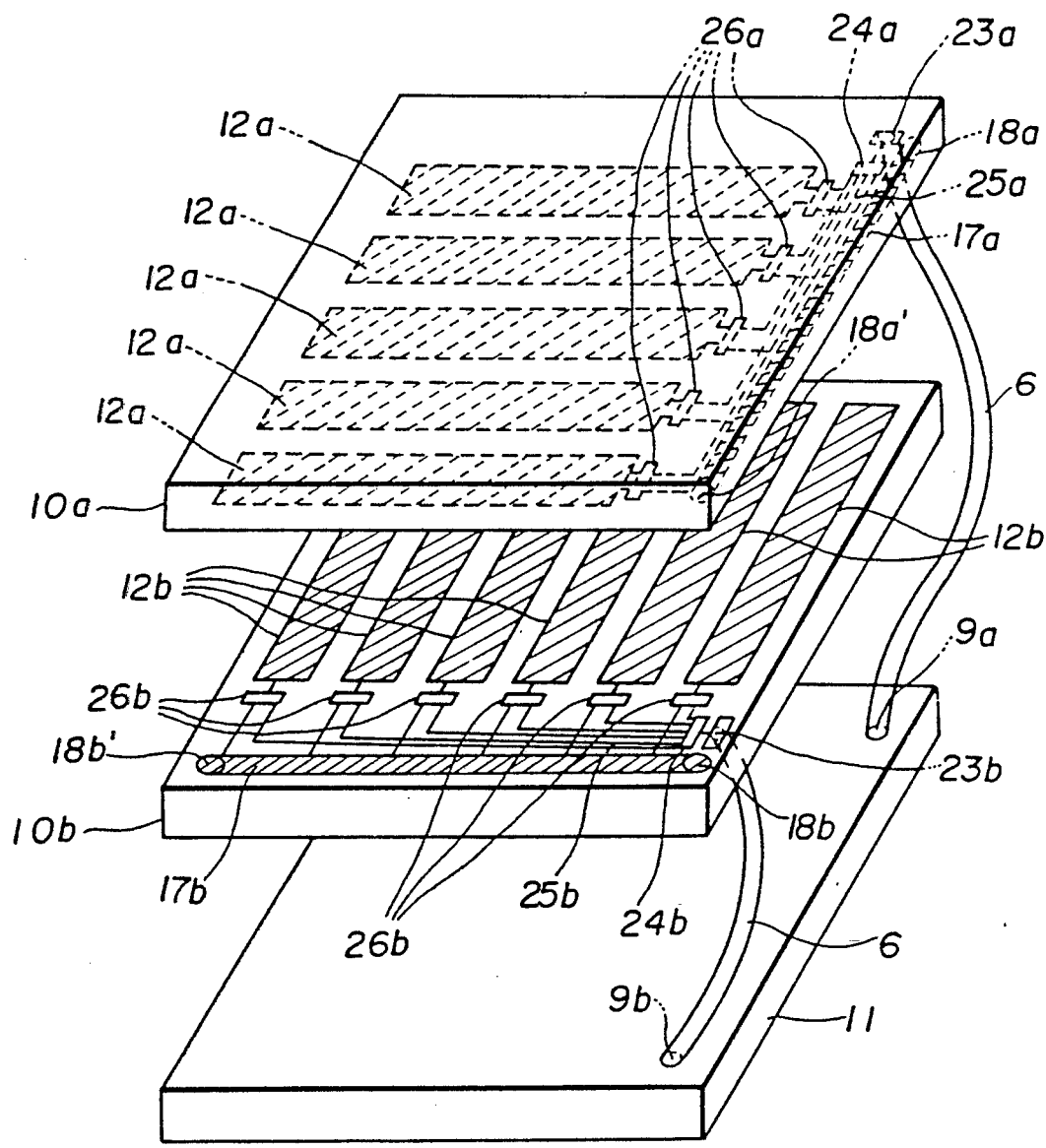
FIG. 9 is an exploded perspective view showing a third embodiment of the liquid crystal display device of the present invention.

Referring to FIG. 9, the substrate 10a carries a receiver 23a for receiving the optical beam from the light emitting device 9a, decoder 24a for demodulating the output signal of the receiver 23a, conductors 25a for distributing output signals of the decoder 24a to switching circuits 26a respectively connected with the scanning electrodes 12a. Each of the switching circuits 26a is interposed between the individual electrode 12a and the scanning signal bus 17a and opens and closes the connection between the electrode 12a and the scanning signal bus 17a responsive to the output signal of the decoder 24a. As described previously with reference to FIG. 2, the scanning signal bus 17a is extended along an edge of the substrate 10a and the terminals 18a and 18a' are formed at respective ends.

Similarly, the substrate 10b carries a receiver 23b for receiving the optical beam from the light emitting device 9b, decoder 24b for demodulating the output signal of the receiver 23b, conductors 25b for distributing output signals of the decoder 24b to switching circuits 26b respectively connected with the scanning electrodes 12b. Each of the switching circuits 26b is interposed between the individual electrode 12b and the scanning signal bus 17b and opens and closes the connection between the electrode 12b and the scanning signal bus 17b responsive to the output signal of the decoder 24b. As described previously with reference to FIG. 2, the scanning signal bus 17b is extended along an edge of the substrate 10b and the terminals 18b and 18b' are formed at respective ends.

Similarly to the case of the first embodiment, any known phototransistors or photodiodes may be used for the receiver 23a and 23b. However, it is particularly preferable to use devices which respond to the infrared optical beams. An example of such devices is already described with reference to FIGS. 4 through 7.

Figure 10:
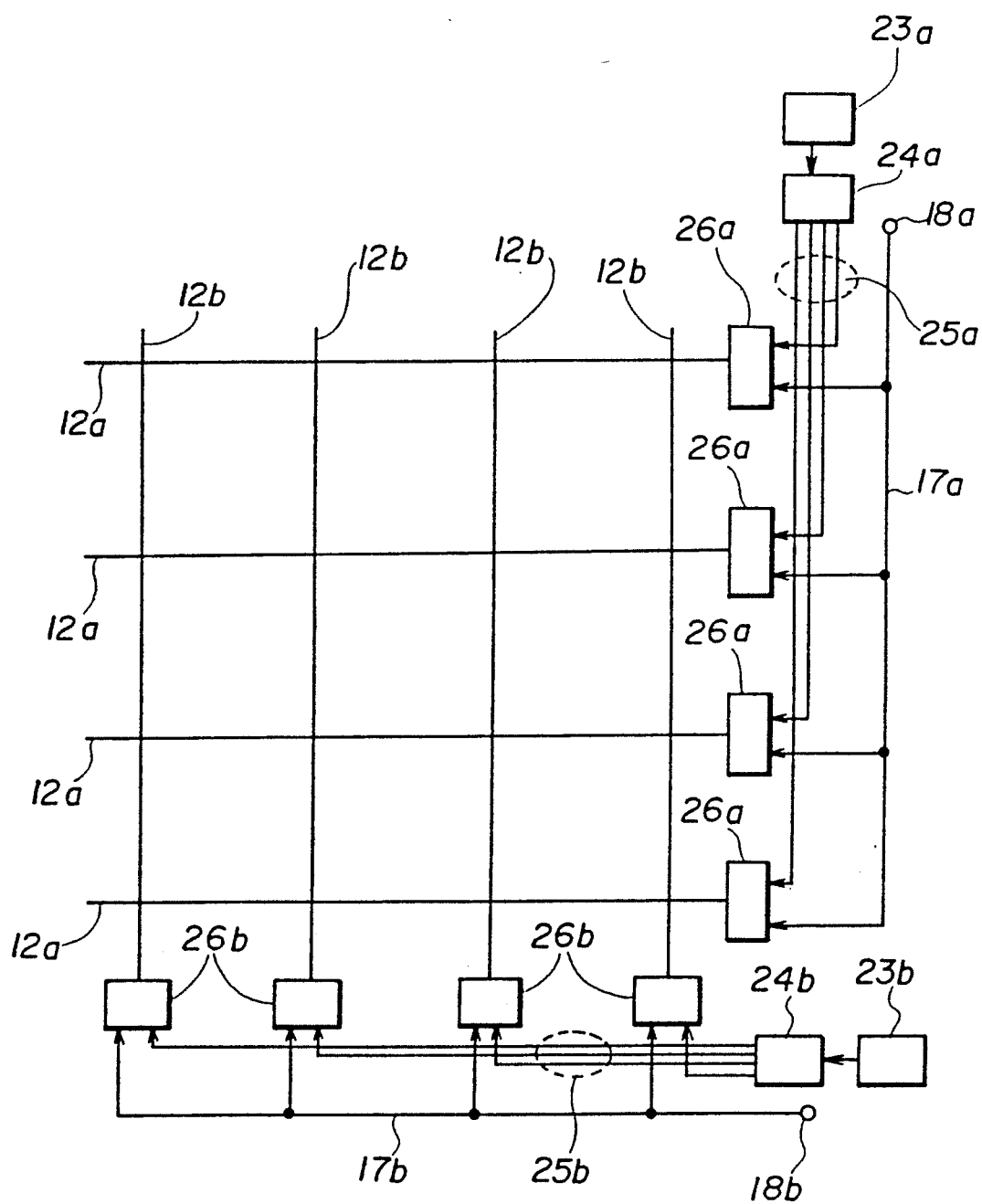
FIG. 10 is a system block diagram showing a wiring provided on a substrate of the liquid crystal display device of FIG. 9.

Referring to FIG. 10 which is a circuit diagram showing the connection between the devices on the substrates 10a and 10b, the scanning signal supplied to the scanning signal bus 17a through the terminal 18a is conducted to the switching circuit 26a which is operated by the output signal from the decoder 24a. Similarly, the display signal supplied to the display signal bus 17b through the terminal 18b is conducted to the switching circuit 26b which is operated by the output signal from the decoder 24b. In the description hereinafter, the control of this switching circuit 26a will be described. It should be noted that the operation of the switching circuit 26b is substantially same as that of the switching circuit 26a and the description of the operation of the switching circuit 26b will be omitted.

The light emitting device 9a produces an optical beam which is modulated with a coded signal carrying an information in a form of a plurality of bits, for example, indicating to which one of the scanning electrodes 12a the scanning signal on the scanning signal bus is to be supplied. The receiver 23a receives the optical beam and produces the output signal corresponding to the signal modulated on the optical beam. This output signal of the receiver 23a is demodulated in the decoder 24a and a plurality of output signals indicating which one of the switching circuits 26a is to be closed are supplied to the respective conductors 25a. The switching circuit 26a is turned on and turned off under the control of the output signal of the decoder 24a supplied thereto through the conductor 25a. A diode matrix may be used for the decoders 24a and 24b, for example.

Figure 11:
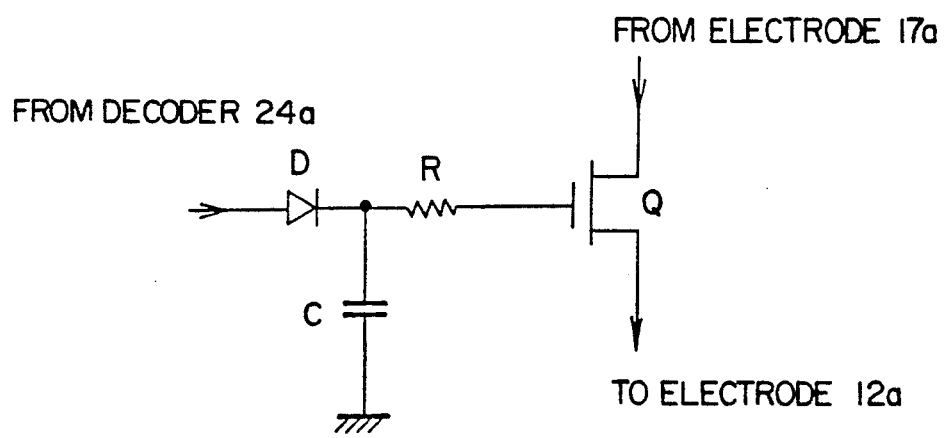
FIGS. 11 and 12 are circuit diagrams showing examples of a switch circuit shown in the system block diagram of FIG. 10.
Figure 12:
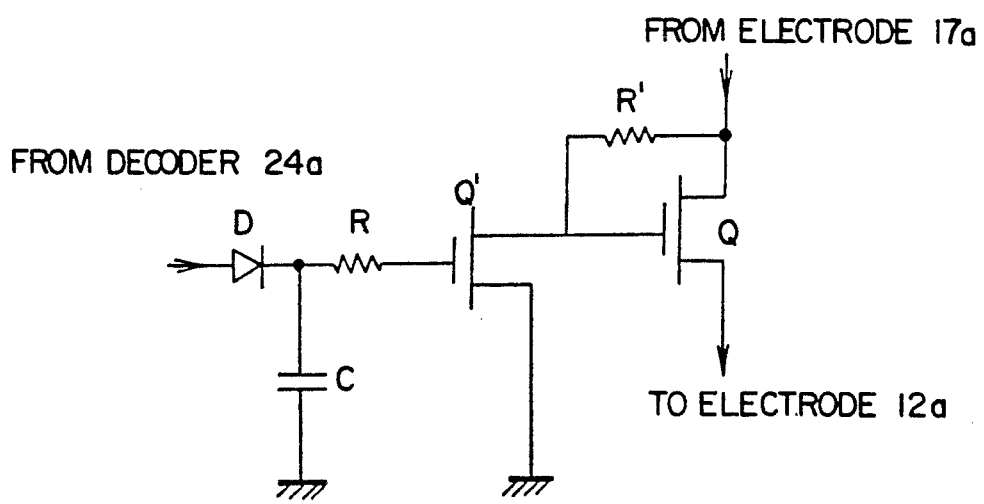

The addressing of the pixels in the liquid crystal display device is performed in accordance with the well known line sequential addressing procedure in which one of the scanning electrodes corresponding to a scanning line along which one line of image is to be displayed is excited by the scanning signal and at a same time a plurality of display electrodes are selected for receiving the video signals corresponding to the one line of image to be displayed along the scanning line. When performing such a line sequential scanning, it is of course possible to provide a memory circuit or delay circuit at an input port of the switching circuit 26a or 26b. However, the use of such memory or delay circuit provided on the substrate is not preferable from the view point of improvement of the efficiency of utilization of the light of the liquid crystal display device as such a device occupies considerable space on the substrate. In the present embodiment, therefore, the switching circuits illustrated in FIGS. 11 and 12 are used. Such circuits occupy less space on the substrate and can be easily formed on the substrate by deposition and patterning of materials.

Referring to FIG. 11, the signal from the decoder 24a or 24b is supplied to an RC circuit comprising a resistor R and a capacitor C via a diode D which prevents reverse current flow. The output signal of the decoder is supplied to an end of the resistor R as well as to an end of the capacitor C. The other end of the capacitor C is grounded and the other end of the resister R is connected to the gate of a field effect transistor Q having a source connected to the scanning signal bus 17a or 17b and a drain connected to the scanning electrode 12a or display electrode 12b. By appropriately setting the time constant of the RC circuit, it becomes possible to close the transistor Q for one horizontal scanning interval responsive to the output signal of the decoder 24a. The resister R may be omitted if the transistor Q has a suitable internal resistance.

In the case of display of a television signal, the number of pixels which are turned on is usually far greater than the number of pixels which are turned off. From this view point, it is more preferable to selectively turn off the pixels responsive to the images to be displayed, while the other pixels are turned on. FIG. 12 shows a switching circuit which is used for such a purpose. In FIG. 12, those portions constructed identically to those corresponding portions of FIG. 11 are given identical reference numerals and the description thereof will be omitted. Referring to FIG. 12, a second field effect transistor Q' is interposed between the RC circuit and the transistor Q such that the other end of the resister is connected to the gate of the transistor Q' having a source connected to the gate of the transistor Q and a drain connected to the ground. Further, the source of the transistor Q' is connected to the source of the transistor Q. The transistor Q in the circuit of FIG. 12 is normally closed as the scanning signal on the scanning signal bus 17a is supplied to its gate via the resister R'. When the output signal of the decoder 24, for example, is supplied to the gate of the transistor Q', the transistor Q' is turned on and the signal path connecting the source and drain of the transistor Q' is closed. The duration in which the transistor Q' is closed can be arbitrarily set by adjusting the time constant of the RC circuit. When the transistor Q' has a suitable internal resistance, the resister R may be omitted. Responsive to the conduction of the transistor Q', the signal supplied to the scanning electrode 12a, for example, through the transistor Q from the scanning signal bus 17a is grounded through the resister R' and the field effect transistor Q is opened.

The description heretofore is for the case in that the switching circuits of FIGS. 11 and 12 are used for the switching circuit 26a. However, the circuits shown in FIGS. 11 and 12 can be used for the switching circuit 26b with suitable adjustment of the time constant of the capacitor C and the resister R.

In the description heretofore, the second embodiment of the liquid crystal display device is described as a matrix array type liquid crystal display device. However, the construction illustrated particularly in FIG. 10 is also applicable to the liquid crystal display device using the active matrix driving system. In such a case, it is possible to use the field effect transistor in the driving circuit for the transistor Q. In such a case one can omit the transistor Q.

When arranging a plurality of such liquid crystal display devices in a form of a matrix to form a large liquid crystal display panel, the electrical connection between the adjacent liquid crystal devices can be simplified, as it is only required to connect the scanning signal bus or the display signal bus of the liquid crystal display device to corresponding scanning signal bus or corresponding display signal bus of the adjacent liquid crystal display device by means of lead wires connected to the terminals 18a, 18a', 18b and 18b'.

In the liquid crystal display panel constructed by assembling such liquid crystal display devices, the electrical connection to the individual liquid crystal device in the panel is achieved by providing electrical connection to one scanning signal bus and one display signal bus. As a result, the number of the liquid crystal display devices in the liquid crystal display panel can be easily changed without changing the design of the receiver, decoder and the switching circuits in the individual liquid crystal devices. It should be noted that such circuit devices are included in each liquid crystal display device. Thus, the size and shape of the liquid crystal display panel thus assembled can be changed as desired without changing the design of the individual liquid crystal devices. Accordingly, a large and reliable liquid crystal display panel can be manufactured easily by assembling the liquid crystal display device of the present invention.

In the aforementioned embodiment, the receiver 23a and 23b may be a photovoltaic device such as a light activated SCR which is triggered by the optical beam having the wavelength in the invisible region. It should be noted that FIG. 9 also shows a use of an optical fiber 6 for operatively connecting the light emitting devices 9a and 9b to the corresponding receivers 23a and 23b.

Furthermore, an ultrasonic signal may be used in the present embodiment for addressing the receivers 23a and 23b in place of the optical beam. Although the directivity of the ultrasonic wave is inferior as compared with that of the optical beam, the mutual separation between the receivers 23a or 23b is relatively large in the present embodiment and the problem of the directivity can be minimized. When the ultrasonic signal is used for addressing, ultrasonic transducers are used in place of the receivers 23a, 23b as well as in place of the light emitting device 9a, 9b.

Figure 13:
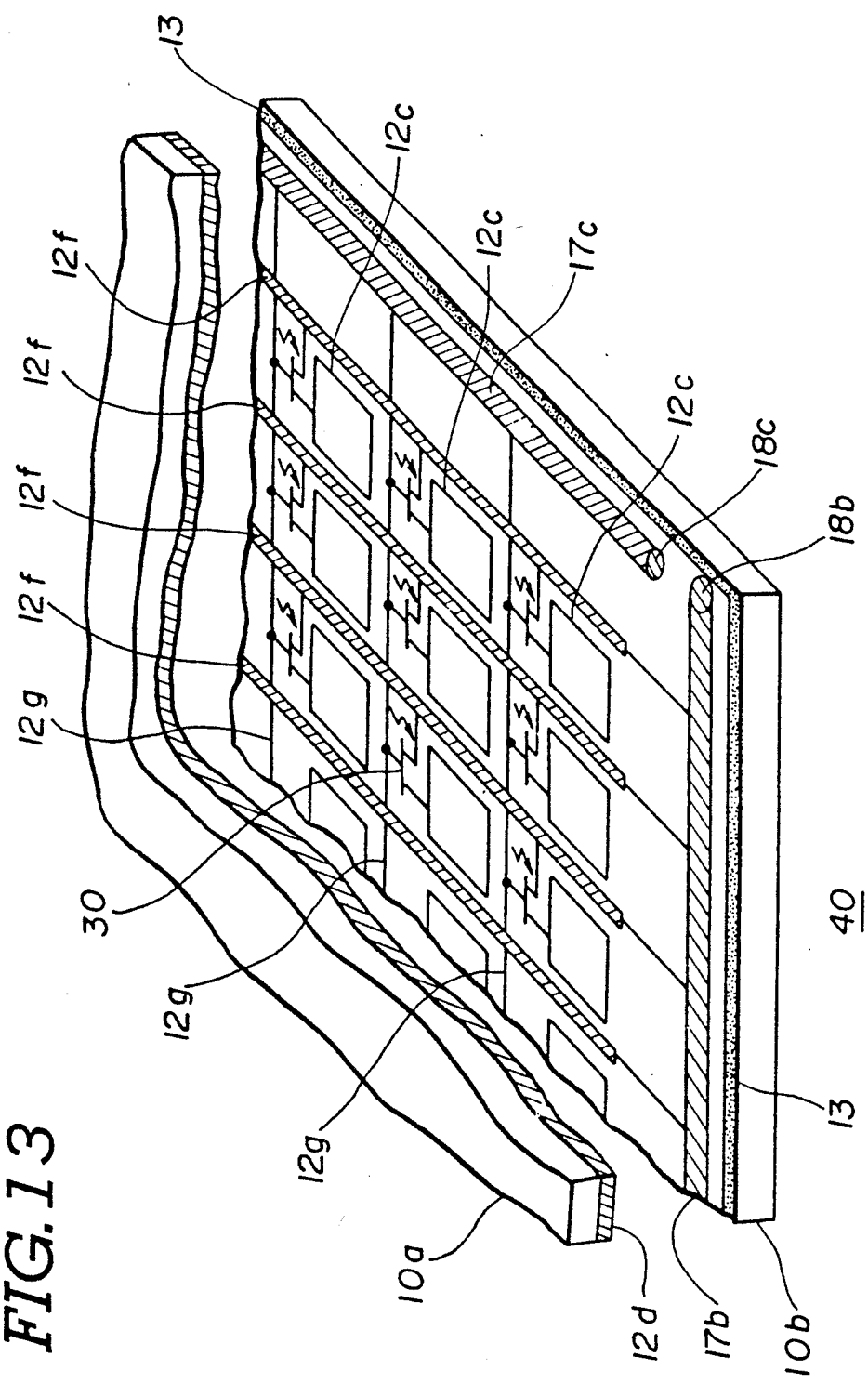
FIG. 13 is an exploded perspective view showing a fourth embodiment of the liquid crystal display device of the present invention.
Figure 14:
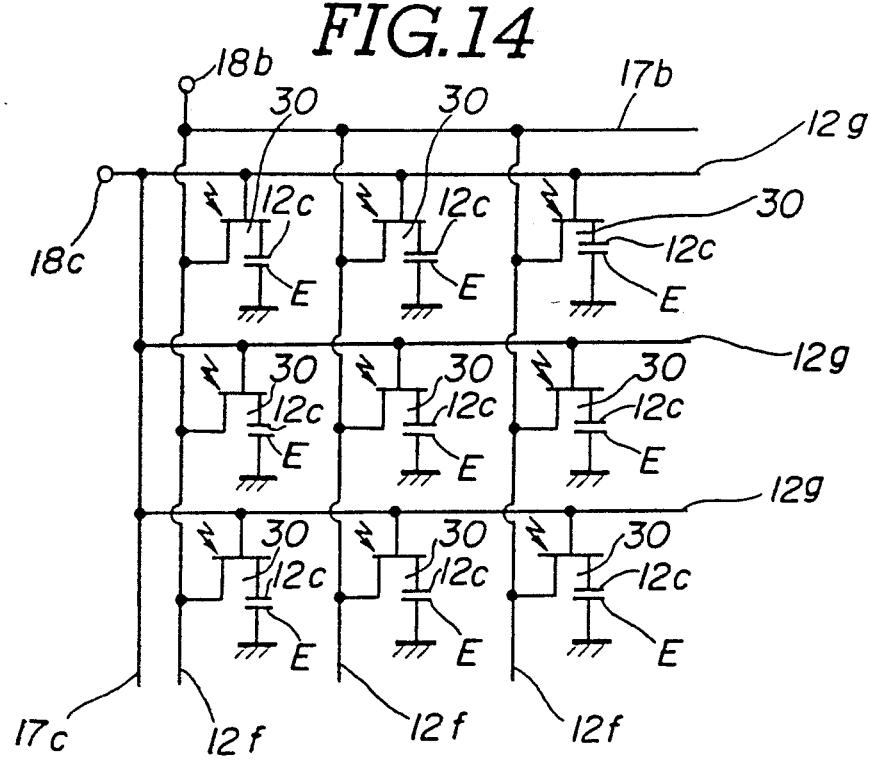
FIG. 14 is a circuit diagram showing a circuit formed on the substrate of the liquid crystal display device of FIG. 13.

FIG. 13 shows a fourth embodiment of the liquid crystal display device of the present invention and FIG. 14 shows a circuit diagram of the circuit formed in the liquid crystal display device of FIG. 14. In the drawing, those portions constructed identically to those corresponding portions in FIG. 3 are given identical reference numerals and the description thereof will be omitted.

Referring to FIG. 13, a known photo transistor 30 is formed on the substrate 10b by a known deposition and patterning technique so as to cooperate with the pixel electrodes 12c. The transistor 30 has a base connected to a lateral electrode 12g for carrying a bias signal, an emitter connected to the display electrode 12f, and a collector connected to the pixel electrode 12c. The base of the transistor 30 is supplied with the bias signal through a path connecting the terminal 18c, a signal bus 17c and the electrode 12g, and the emitter of the transistor 30 is supplied with the video signal through a path connecting the terminal 18b, display signal bus 17b and the electrode 12f. This video signal on the display signal bus 17b is supplied to the pixel electrode when the phototransistor 30 is turned on responsive to the irradiation of the optical beam.

Figure 15:
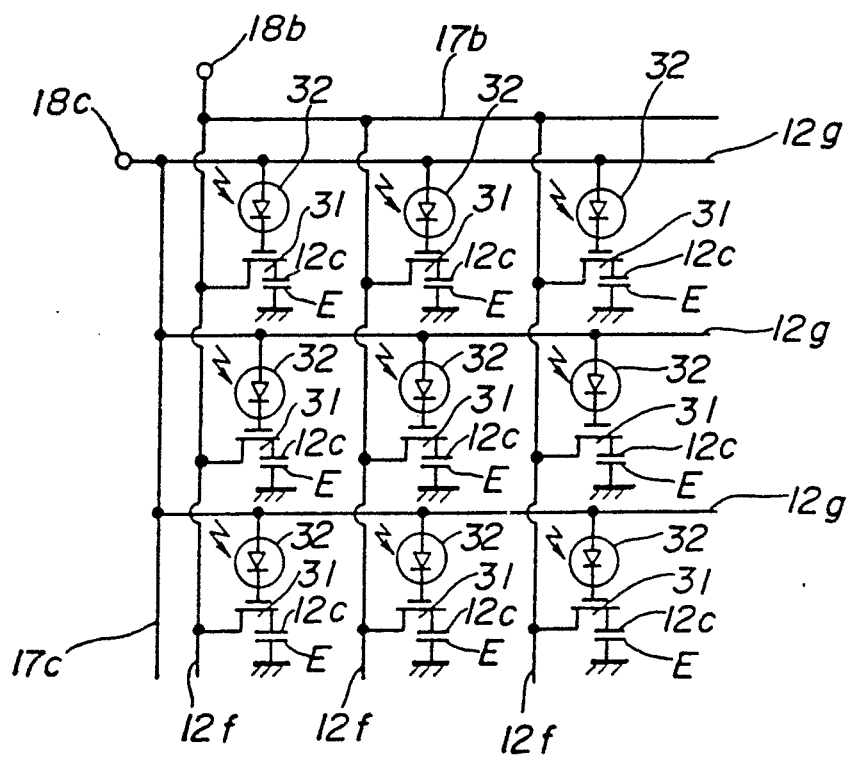
FIG. 15 is a circuit diagram showing still other example of the circuit of the liquid crystal display device of FIG. 13.

FIG. 15 is a circuit diagram similar to FIG. 14 showing a modification of the liquid crystal display device of FIG. 13. In the drawing, those portions identically constructed to those corresponding portions in FIG. 14 are given the identical reference numerals and the description thereof will be omitted. In the circuit of FIG. 14, any of the non-linear devices such as the known thin film transistor (TFT) 31 may be used in place of the phototransistor 30. Further, a photodiode 32 is interposed between the gate of the transistor 31 and the lateral electrode 12g. The phototransistor 32 changes in state to a conductive state responsive to the irradiation of the optical beam and the bias signal of the lateral electrode 12g is supplied to the gate of the transistor 31. Thus, the transistor 31 is turned on.

Figure 16:
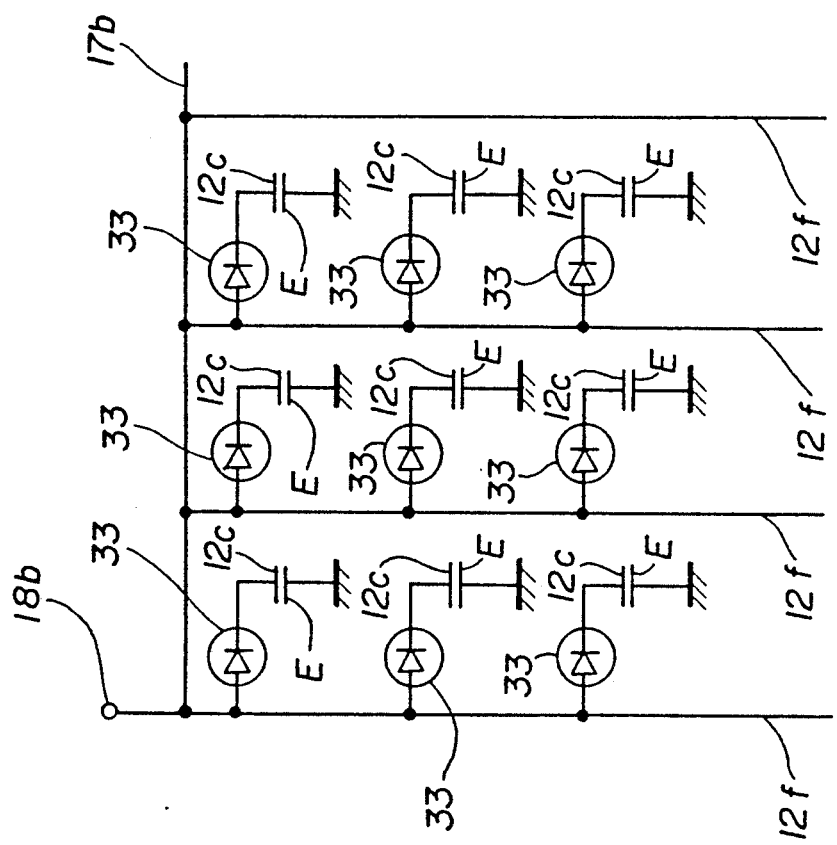
FIG. 16 is a circuit diagram showing still other circuit of the liquid crystal display device of FIG. 13.

FIG. 16 is a circuit diagram similar to FIG. 14 showing another modification of the liquid crystal display device of FIG. 13. In the drawing, those portions identically constructed to those corresponding portions in FIG. 14 are given the identical reference numerals and the description thereof will be omitted.

Referring to FIG. 16, the pixel electrode 12c is connected to the electrode 12f via a photodiode 33 which conducts the video signal supplied to the display signal bus 17b via the terminal 18b to the pixel electrode 12c responsive to the irradiation of the optical beam. It should be noted that the terminal 18a, scanning signal bus 17a and the scanning electrode 12e are not used in this modification.

Figure 17:
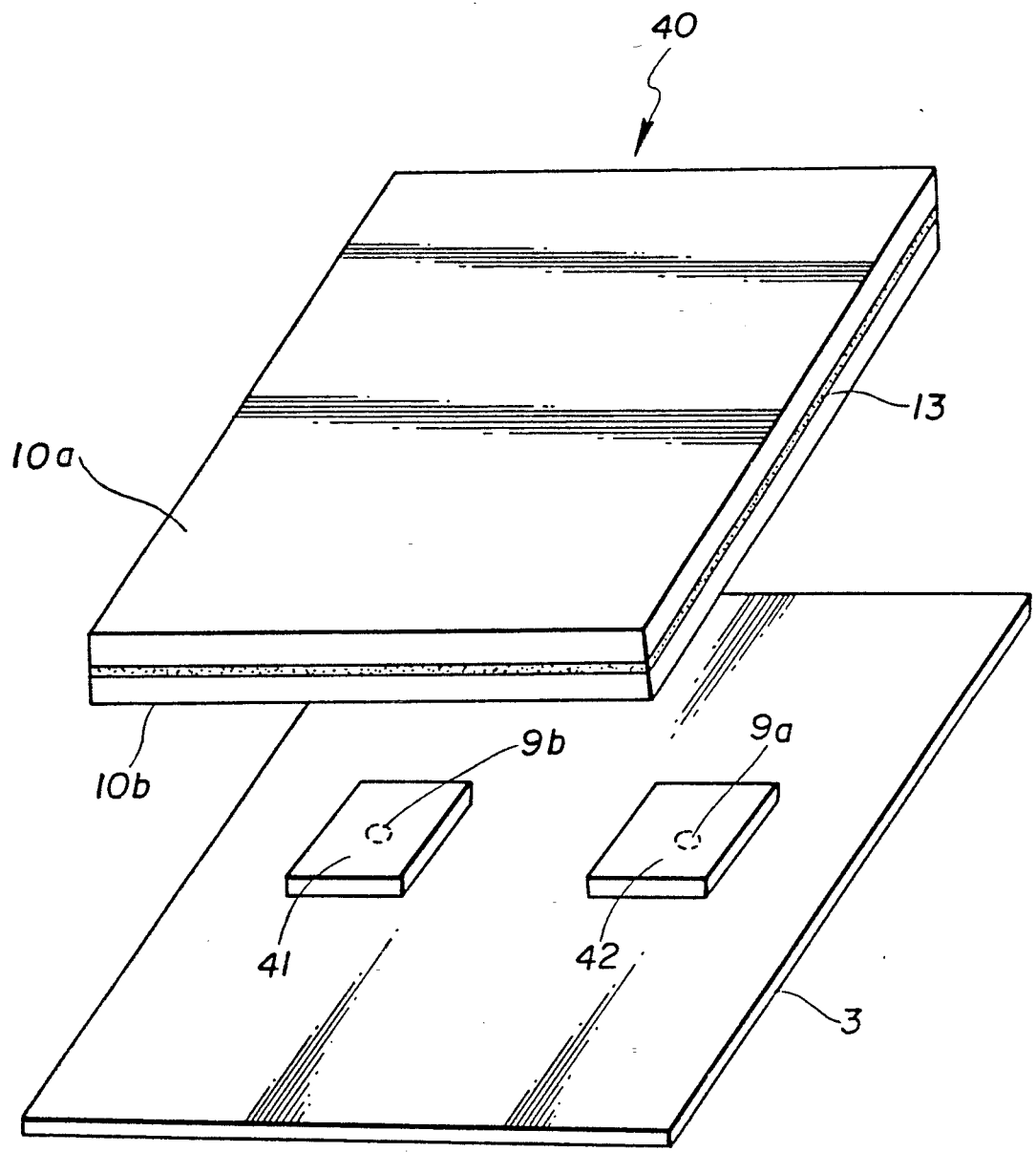
FIG. 17 is a diagram showing the liquid crystal display device of FIG. 13 together with a scanning system of an optical beam.

The liquid crystal display device of FIG. 13 is scanned by the optical beam from the light emitting device 9a provided for example on the reflector 3 of FIG. 1. FIG. 17 shows a mechanism for addressing the pixels on the liquid crystal display device by the scanning of the optical beam. In the drawing, the reference numeral 40 designates the liquid crystal display device of FIG. 13 comprising the substrates 10a and 10b, and the reflector 3 carrying the light emitting devices 9a. In the illustrated example, the light emitting devices 9a are provided on a side of the reflector 3 facing the liquid crystal display device 40, and PLZT devices 41 and 42 are provided on the reflector 3 in the optical path of the optical beam for deflecting the optical beam from the light emitting devices 9a. The PLZT devices 41 and 42 are provided with a plurality of electrodes and induce an electro-optic effect responsive to the application of voltage signals thereto. As a result, the optical beam is deflected so as to scan the surface of the liquid crystal display device 40.

As a result of the construction of the liquid crystal display device as illustrated in FIG. 17, the number of the light emitting devices selectively cooperating with the phototransistors or photodiodes constituting the receiver can be reduced, the degree of freedom in the design in increased particularly with respect to the number of the receivers to be used, the provision of the light emitting device on the substrate is facilitated, and the cross-talk between the receivers can be suppressed. As the operation of the liquid crystal display devices of FIG. 13 and FIG. 17 are identical to the operation of the liquid crystal display device of FIG. 3 except for the use of the phototransistors 30 in place of the optically activated switches of FIG. 3, the description thereof will be omitted.

Figure 18:
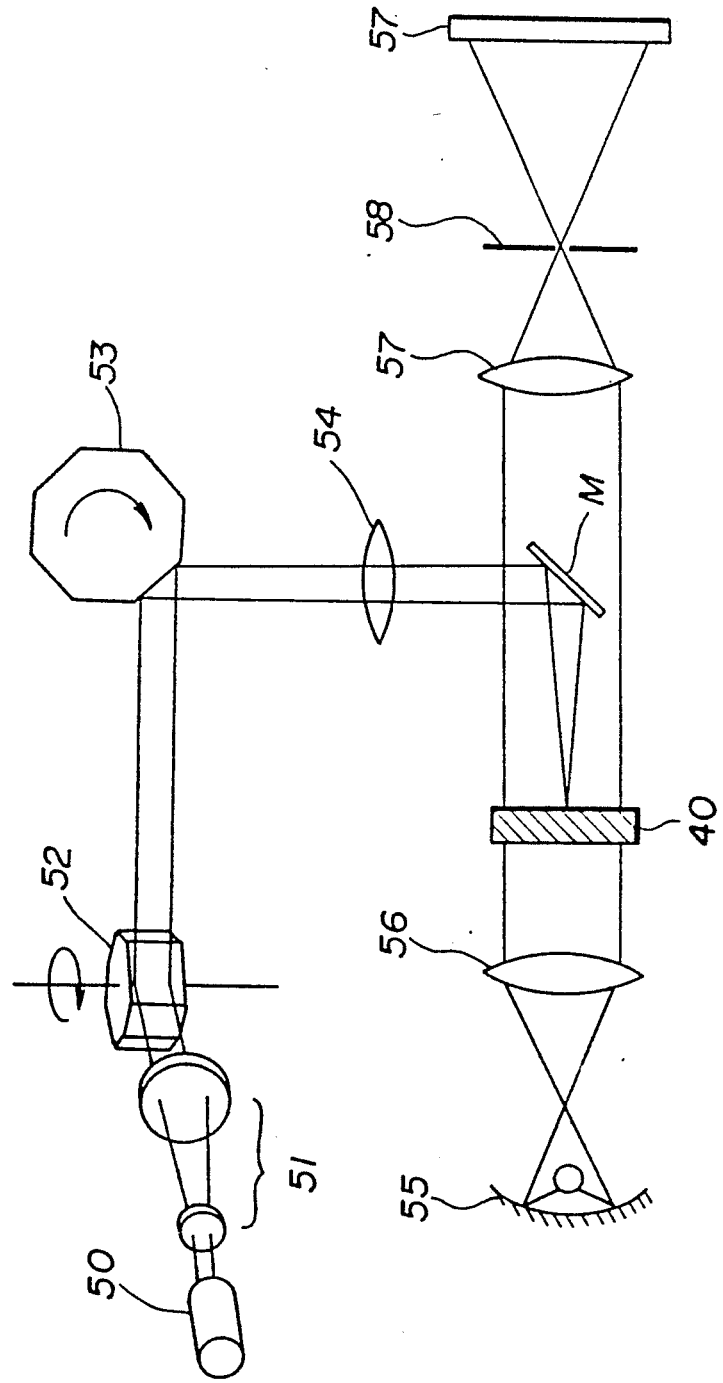
FIG. 18 is a diagram showing a use of the liquid crystal display device of FIG. 13 in a projection type liquid crystal display apparatus.

FIG. 18 is a drawing showing an example of the application of the liquid crystal display device of FIG. 13 in which the liquid crystal display device is used for a projection type liquid crystal display apparatus.

In this apparatus, an optical beam radiated from an optical beam radiating device 50 such as a YAG laser oscillating at a near infrared wavelength or an infrared light emitting device such as a GaAlAs or GaAs light emitting diode is expanded by a beam expander 51 and supplied to a pair of rotary polygonal mirrors 52 and 53 respectively for deflecting the optical beam in mutually perpendicular directions. The optical beam thus deflected is then focused on the liquid crystal display device 40 after passing through a lens 54 and a fixed mirror M which reflects the infrared light beam from the beam radiating device 50 but passes a visible light. The width of the optical beam is several microns and when it hits the optically activated switches such as the phototransistor 30, photodiode 32 or 33, the optical beam induces the change of in the conduction state of the switches from the nonconductive state to the conductive state. As a result, the video signal is supplied to the pixel electrodes 12c and the change in the molecular orientation of the liquid crystal molecules corresponding to the image to be displayed is induced in the liquid crystal display device 40. At the same time, a light from a light source 55 comprising an assembly of a reflector and a light bulb is cast on the liquid crystal display device 40 after passing through a condenser lens 56 for producing a parallel light beam. The light beam passing through the liquid crystal display device 40 is passed through a lens 57 and an aperture 58 and focused on a screen 59.

As a result of the use of the liquid crystal display device 40 to such a projection type liquid crystal display apparatus, one can use a liquid crystal which changes the molecular orientation responsive to the applied electric field in the liquid display device. In the past, on the contrary, such a projection type liquid crystal display apparatuses used liquid crystals which performs a thermally induced phase transition. In such a conventional liquid crystal display apparatus, a relatively long time is required to induce the necessary phase change in the liquid crystals, and the substance performing such a phase transition under a desirable condition is limited. In the present invention, the response of the liquid crystal molecules is instant and one can choose a suitable liquid crystal from a wide variety of the liquid crystal substances.

In such a projection type liquid crystal display apparatus, the optical beam used for addressing the pixels must be invisible. Therefore, YAG lasers, or GaAlAs or GaAsP light emitting diodes are used which oscillates at a wavelength in the near-infrared region. It also possible to use the optically activated switches 16a and 16b described with reference to FIGS. 4 through 7 in place of the photo diode 32 or 33. Further, a filter which is not illustrated is used in FIG. 18 to cut off the infrared light component from the light beam radiated from the light source 55.

Figure 19:
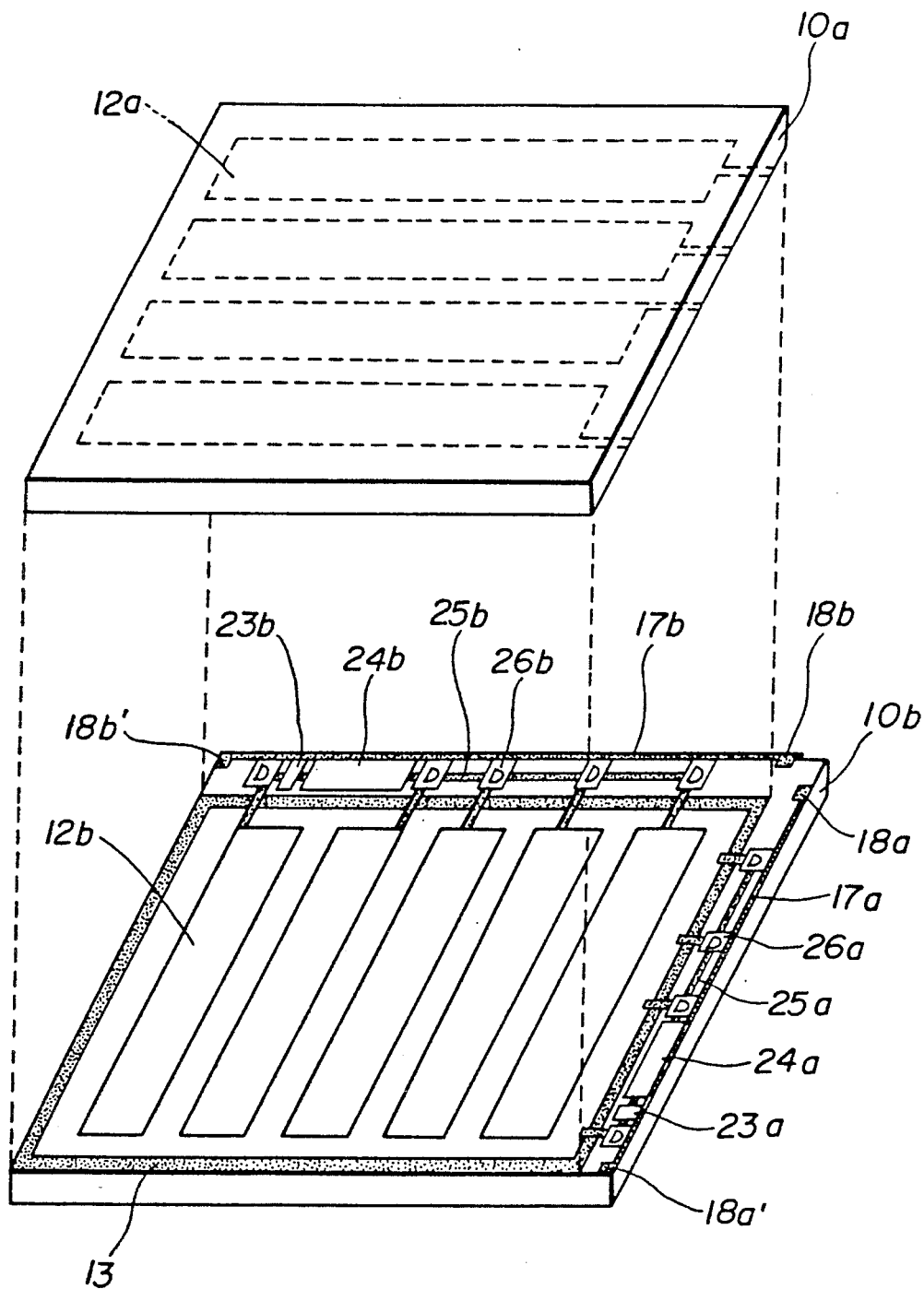
FIG. 19 is an exploded perspective view showing a modification of the liquid crystal display device of FIG. 9.
Figure 20:
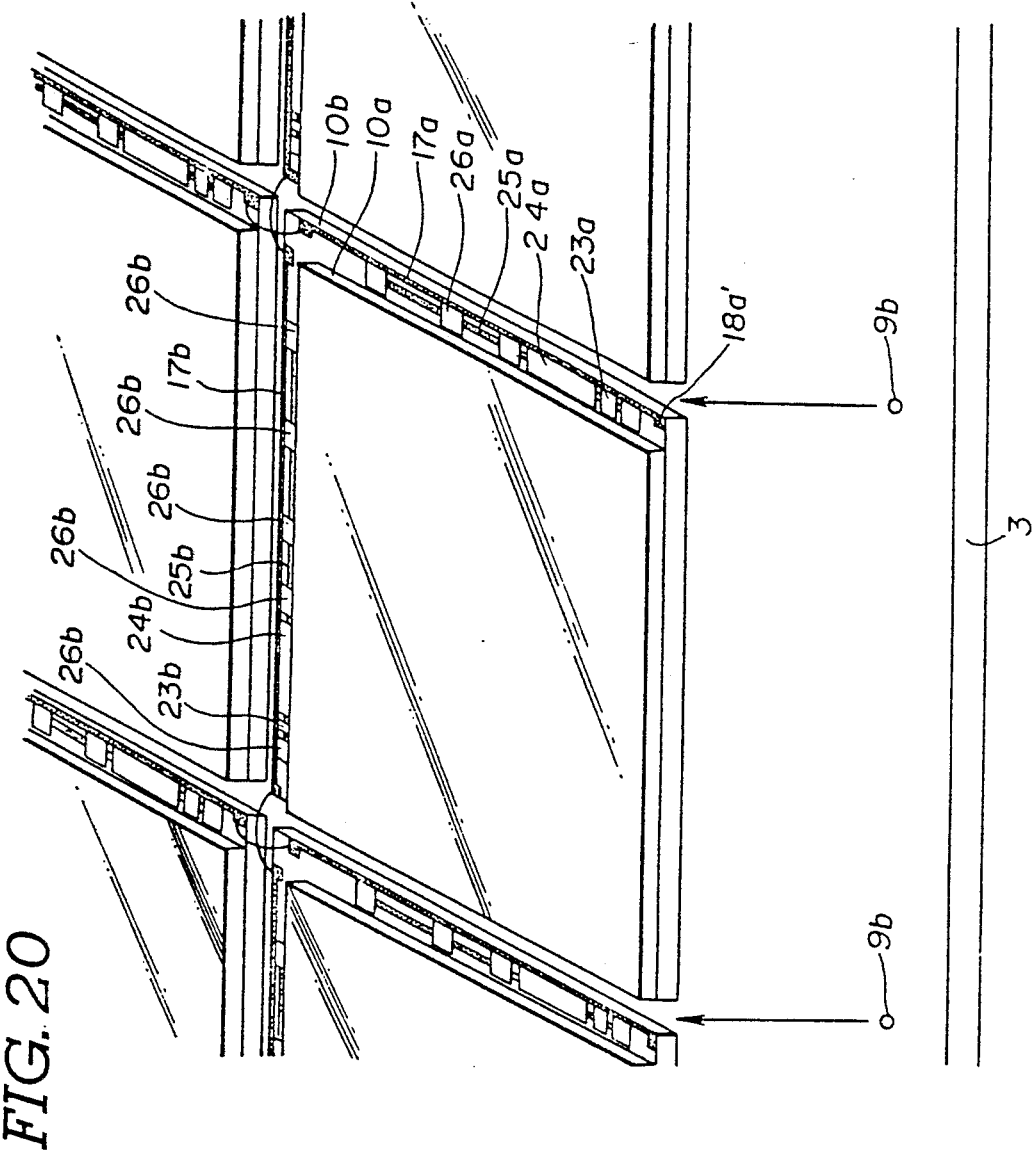
FIG. 20 is a perspective view showing a part of the liquid crystal display device of FIG. 19 on an enlarged scale.

FIGS. 19 and 20 illustrate a modification of the liquid crystal display device of FIG. 9. In the drawings, those parts constructed identically to those corresponding parts in FIG. 9 are given identical reference numerals and the description thereof will be omitted.

Referring to FIG. 19, the receivers 23a and 23b, the decoders 24a and 24b, the conductors 25a and 25b, and the switching circuits 26a and 26b are made from separately manufactured parts and mounted on the substrate 10b at a region outside of the area defined by the perimeter seal 13. Further, the substrate 10a carrying the electrodes 12a extend only for such an extent so as to cover the area of the substrate 10b defined by the perimeter seal 13 as clearly illustrated in FIG. 20. As a result of such a construction, no circuit devices are provided within the area defined by the perimeter seal 13 and the disturbance in the alignment of the molecules of the liquid crystal sealed in such an area is eliminated. Further, the difficulty in forming such circuit devices such as the receiver 23a, 23b, decoder 24a, 24b or switching circuit 26a, 26b on the substrate by deposition and patterning is avoided and the manufacturing of the liquid display device is facilitated. As can be seen in FIG. 20, the circuit devices disposed outside of the perimeter seal 13 can have an arbitrary thickness unless the thickness does not exceed the thickness of the substrate 10a disposed on the surface of the substrate 10b. Thus, the circuit devices do not have to be extremely thin and the devices manufactured by ordinary and well established procedures can be used.

Further, the present invention is not limited to these embodiments, but various variations and modifications may be made without departing from the scope of the present invention.

What is claimed is:

1. A liquid crystal display device for displaying an image by applying a video signal of the image to be displayed on the liquid crystal display device and a scanning signal thereto, comprising:

first and second substrates disposed parallel to each other;

a liquid crystal layer disposed between the first and second substrates, said first and second substrates having surfaces which oppose with each other so as to define the liquid crystal layer therebetween;

electrode means disposed between the first and second substrates and contacting the liquid crystal layer, said electrode means comprising a common electrode provided on the surface of said first substrate, a first group of electrodes provided on the surface of the second substrate and extending parallel to each other in a first direction, a second group of electrodes insulated from the first group of electrodes and provided on the surface of the second substrate so as to extend parallel with each other in a second direction substantially perpendicular to the first direction so that the surface of the second substrate is divided into a plurality of sections by said first and second groups of electrodes, and a plurality of pixel electrodes provided on the surface of the second substrate respectively in said plurality of sections so as to oppose the common electrode across the liquid crystal layer;

a plurality of driving means provided on the surface of the second substrate so as to be connected to said first and second groups of electrodes respectively in correspondence to the pixel electrodes for driving the pixel electrode; and optically activatable switch means disposed between the first and second substrates and connected to said electrode means for selectively supplying said scanning signal and video signal to said electrode means to excite said liquid crystal layer for displaying said image.

2. A liquid crystal display device as claimed in claim 1 in which said optically activatable switch means comprises a first conductor disposed on the second substrate for carrying a scanning signal to be supplied to one of the first group of electrodes for driving said driving means which is connected to said one of the first group of electrodes, a second conductor disposed on the second substrate for carrying the video signal to be supplied to one of the second group of electrodes for driving said driving means which is connected to said one of the second group of electrodes, a plurality of first radiation beam activated switches provided on the second substrate for selectively supplying the scanning signal from the first conductor to said one of the first group of electrodes in response to a radiation beam incident to a corresponding one of the first radiation beam activated switches, a plurality of second radiation beam activated switches provided on the second substrate for selectively supplying the video signal from the second conductor to said one of the second group of electrodes in response to a radiation beam incident to a corresponding one of the second radiation beam activated switches.

3. A liquid crystal display device for displaying an image by applying a video signal of the image to be displayed on the liquid crystal display device and a scanning signal thereto, comprising:

first and second substrates disposed parallel to each other;

a liquid crystal layer disposed between the first and second substrates;

electrode means disposed between the first and second substrates and contacting the liquid crystal layer; and optically activatable switch means disposed between the first and second substrates and connected to said electrode means for selectively supplying said scanning signal and video signal to said electrode means to excite said liquid crystal layer for displaying said image, said optically activated switch devices comprising a plurality of optically activated switch devices, each of which is turned on or turned off in response to an irradiation of an infrared beam incident thereto.

4. A liquid crystal display device as claimed in claim 3 further comprising a light emitting means cooperating with a group of said plurality of optically activated switch devices and deflection means for deflecting an optical beam from the light emitting means so as to sequentially scan the plurality of optically activated switch devices.

5. A liquid crystal display device as claimed in claim 4 in which said light emitting means is carried on a third substrate disposed so as to face the other side of the second substrate from said first substrate, said deflection means being an electrooptic device comprising a layer of PLZT compound which deflects the optical beam passing therethrough due to an electrooptic effect thereof.

6. A liquid crystal display device as claimed in claim 4 in which said deflection means is a deflection mirror disposed in an optical path of the optical beam exiting from the light emitting means and reaching the optically activated switch devices.

* * * * *

UNITED STATES PATENT AND TRADEMARK OFFICE
CERTIFICATE OF CORRECTION

PATENT NO. : 5,064,275
DATED : November 12, 1991
INVENTOR(S) : Ichiro Tsunoda and Toshiyasu Eguchi It is certified that error appears in the above-identified patent and that said Letters Patent is hereby corrected as shown below:

On the title page, item [73] Assignee:

After Tokai delete "Company" and substitute therefor ---University---.

Signed and Sealed this

First Day of August, 1995

*Attest:*

BRUCE LEHMAN

*Attesting Officer*  *Commissioner of Patents and Trademarks*